(12) United States Patent
Isogai et al.

(10) Patent No.: US 9,741,374 B1
(45) Date of Patent: Aug. 22, 2017

(54) THERMALLY-ASSISTED MAGNETIC RECORDING HEAD AND MANUFACTURING METHOD THEREFOR

(71) Applicant: TDK CORPORATION, Tokyo (JP)

(72) Inventors: Makoto Isogai, Tokyo (JP); Masahiro Saito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/378,765

(22) Filed: Dec. 14, 2016

(51) Int. Cl.
| | | |
|---|---|---|
| *G11B 5/02* | (2006.01) | |
| *G11B 11/00* | (2006.01) | |
| *G11B 5/39* | (2006.01) | |
| *G11B 5/40* | (2006.01) | |
| *G11B 5/48* | (2006.01) | |
| *G11B 5/00* | (2006.01) | |

(52) U.S. Cl.
CPC ............ *G11B 5/3929* (2013.01); *G11B 5/40* (2013.01); *G11B 5/4866* (2013.01); *G11B 2005/0021* (2013.01)

(58) Field of Classification Search
CPC .......... G11B 5/3903; G11B 2005/3996; G11B 5/4907; G11B 5/2452; G11B 2005/0021; G11B 2005/0005; G11B 5/314; G11B 11/10595; G11B 11/1053; G11B 11/10534; G11B 11/10508; G11B 11/10443; G11B 11/10532; B82Y 25/00; B82Y 10/00

USPC .... 360/59, 324, 313, 328; 369/13.33, 13.32, 369/13.22, 13.17, 13.14
See application file for complete search history.

(56) References Cited

U.S. PATENT DOCUMENTS

| | | |
|---|---|---|
| 8,861,318 B1 | 10/2014 | Lee et al. |
| 9,196,278 B1 * | 11/2015 | Tatah .................. G11B 5/4866 |
| 2015/0194172 A1 | 7/2015 | Peng et al. |

FOREIGN PATENT DOCUMENTS

JP    2007-188583 A    7/2007

* cited by examiner

*Primary Examiner* — Nabil Hindi
(74) *Attorney, Agent, or Firm* — Oliff PLC

(57) ABSTRACT

A head includes a head body having a medium facing surface, and a protective film covering the medium facing surface. The head body includes a main pole, a waveguide, a plasmon generator, and a main light-blocking section. The waveguide has an entrance end face and an exit end face. The plasmon generator has a near-field light generating surface. The medium facing surface includes a first region including neither of the exit end face and the near-field light generating surface, and a second region including the exit end face and the near-field light generating surface. The protective film includes a first portion covering the first region, and a second portion covering the second region. The main light-blocking section is located to intersect an imaginary straight line connecting the entrance end face and the first region.

13 Claims, 25 Drawing Sheets

THERMALLY-ASSISTED MAGNETIC RECORDING HEAD AND MANUFACTURING METHOD THEREFOR

BACKGROUND OF THE INVENTION

1. Field of the Invention

The present invention relates to a thermally-assisted magnetic recording head for writing data on a magnetic recording medium with the coercivity thereof lowered by applying near-field light thereto, and a manufacturing method for the thermally-assisted magnetic recording head.

2. Description of the Related Art

With recent increases in recording density of magnetic recording devices such as magnetic disk drives, there has been demand for improved performance of magnetic heads and magnetic recording media. In a magnetic disk drive, a magnetic head is provided in the form of a slider configured to slightly fly over the surface of a magnetic recording medium. Typically, the magnetic head of such a form includes a head body having a medium facing surface for facing the magnetic recording medium, and a protective film for protecting the medium facing surface of the head body. The head body includes the principal components of the magnetic head.

To increase the recording density of a magnetic recording device, it is effective to make the magnetic fine particles of the magnetic recording medium smaller. Making the magnetic fine particles smaller, however, disadvantageously lowers the thermal stability of magnetization of the magnetic fine particles. To overcome this problem, it is effective to increase the anisotropic energy of the magnetic fine particles. However, increasing the anisotropic energy of the magnetic fine particles leads to an increase in coercivity of the magnetic recording medium, thereby making it difficult to perform data writing with existing magnetic heads.

As a solution to the problems described above, there has been proposed a technology called thermally-assisted magnetic recording. The technology uses a magnetic recording medium having high coercivity. When writing data, a write magnetic field and heat are applied almost simultaneously to the area of the magnetic recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the magnetic recording medium. A known method for generating near-field light is to use a plasmon generator, which is a piece of metal that generates near-field light from plasmons excited by irradiation with light. The light to be used for generating near-field light is typically guided through a waveguide, which is provided in the head body, to the plasmon generator provided in the head body near the medium facing surface.

The light to be used for generating near-field light can be supplied to the waveguide by, for example, fixing a light source onto the head body and causing the light emitted from the light source to enter the entrance end of the waveguide, as disclosed in U.S. Pat. No. 8,861,318 B1, U.S. Patent Application Publication No. 2015/0194172 A1, and JP 2007-188583A.

In a thermally-assisted magnetic recording head, the plasmon generator gets hot due to heat generated by itself during write operation. As a result, the plasmon generator expands, or shrinks by aggregation. The thermally-assisted magnetic recording head may thus suffer from damage to part of the protective film near the plasmon generator due to the heat generated by the plasmon generator or due to a deformation of the plasmon generator caused by the heat.

U.S. Pat. No. 8,861,318 B1 discloses one of solutions to the foregoing problem. More specifically, U.S. Pat. No. 8,861,318 B1 discloses a thermally-assisted magnetic recording head including a waveguide, a magnetic pole, a plasmon generator, a first protective film and a second protective film. The waveguide has a first end face located in the medium facing surface. The magnetic pole has a second end face located in the medium facing surface. The plasmon generator has a third end face located in the medium facing surface. The first protective film covers the second end face. The second protective film covers the first end face and the third end face. The first and second protective films, in combination, will be collectively referred to herein as the overall protective film.

According to the thermally-assisted magnetic recording head disclosed in U.S. Pat. No. 8,861,318 B1, the second protective film has higher heat resistance than the first protective film. This makes it possible to prevent damage to the second protective film, which covers the third end face of the plasmon generator.

Further, U.S. Pat. No. 8,861,318 B1 describes a method for forming the overall protective film as follows. First, the first protective film is formed to cover the medium facing surface. Then, a photoresist film is formed to cover the first protective film. Then, light is projected onto the entrance end of the waveguide, and the photoresist film is exposed to the light having passed through the waveguide to thereby form an exposure region on the photoresist film. The exposure region is then etched to form an opening in the first protective film. Then, the second protective film is formed to fill the opening.

The above-described method has a disadvantage in that part of the light projected onto the entrance end of the waveguide passes through a part of the head body other than the waveguide and reaches the photoresist film to cause the photoresist film to undergo unwanted exposure at a region thereof not intended to be the exposure region, thus resulting in reduced reliability of the overall protective film.

U.S. Pat. No. 8,861,318 B1 describes a technique to form a light shield to be adjacent to the magnetic pole. However, the technique cannot overcome the aforementioned disadvantage.

SUMMARY OF THE INVENTION

It is a first object of the present invention to provide a thermally-assisted magnetic recording head including a protective film of high reliability, and a manufacturing method for the same.

A thermally-assisted magnetic recording head of the present invention includes: a head body having a medium facing surface configured to face a magnetic recording medium; and a protective film covering the medium facing surface. The head body includes: a plurality of head components for use to write data on the magnetic recording medium; an insulating section formed of an insulating material; and at least one main light-blocking section. The plurality of head components include a main pole for producing a write magnetic field, a waveguide, and a plasmon generator.

The waveguide has an exit end face located in the medium facing surface and an entrance end face opposite to the exit end face, and is configured to allow excitation light having entered the entrance end face to propagate through the waveguide and exit from the exit end face.

The plasmon generator has a near-field light generating surface located in the medium facing surface, and is configured to excite, on the plasmon generator, a surface plasmon resulting from the excitation light propagating through the waveguide, and to generate near-field light from the surface plasmon at the near-field light generating surface.

The medium facing surface includes a first region and a second region. The first region includes neither of the exit end face and the near-field light generating surface. The second region includes the exit end face and the near-field light generating surface. The protective film includes a first portion covering the first region and a second portion covering the second region. The first portion and the second portion are different from each other in at least one of thickness and material configuration. The at least one main light-blocking section is lower in transmittance for light of any wavelength within the range of 10 to 900 nm than the waveguide and the insulating section, and is located to intersect at least one imaginary straight line connecting the entrance end face and the first region.

The thermally-assisted magnetic recording head of the present invention may further include an excitation light source mounted on the head body, for emitting the excitation light to allow it to enter the entrance end face.

In the thermally-assisted magnetic recording head of the present invention, the distance from the medium facing surface to the at least one main light-blocking section may be smaller than or equal to one-half the distance from the medium facing surface to the entrance end face. In such a case, the head body may further include at least one subsidiary light-blocking section. The at least one subsidiary light-blocking section is lower in transmittance for light of any wavelength within the range of 10 to 900 nm than the waveguide and the insulating section. The distance from the medium facing surface to the at least one subsidiary light-blocking section is greater than one-half the distance from the medium facing surface to the entrance end face.

In the thermally-assisted magnetic recording head of the present invention, the at least one main light-blocking section may be formed of metal.

In the thermally-assisted magnetic recording head of the present invention, the at least one imaginary straight line may intersect none of the plurality of head components.

In the thermally-assisted magnetic recording head of the present invention, the second portion may be greater in thickness than the first portion.

In the thermally-assisted magnetic recording head of the present invention, the first portion and the second portion may be formed of respective single materials different from each other. Further, one of the first portion and the second portion may include a layer of a material that is not contained in the other of the first portion and the second portion.

A manufacturing method for the thermally-assisted magnetic recording head of the present invention includes the step of fabricating the head body and the step of forming the protective film. The step of forming the protective film includes the step of forming a mask by patterning a photoresist film, and the step of forming the first portion and the second portion by using the mask. The step of forming the mask includes the step of causing exposure light to enter the entrance end face of the waveguide and exposing a portion of the photoresist film covering the second region of the medium facing surface to the exposure light emerging from the exit end face.

In the manufacturing method of the present invention, the exposure light may be different in wavelength from the excitation light.

In the manufacturing method of the present invention, the mask may cover the first region and not cover the second region. Alternatively, the mask may cover the second region and not cover the first region.

The thermally-assisted magnetic recording head and its manufacturing method of the present invention achieve enhanced reliability of a protective film in the thermally-assisted magnetic recording head.

Other and further objects, features and advantages of the present invention will appear more fully from the following description.

DETAILED DESCRIPTION OF THE PREFERRED EMBODIMENT

Figure 10:
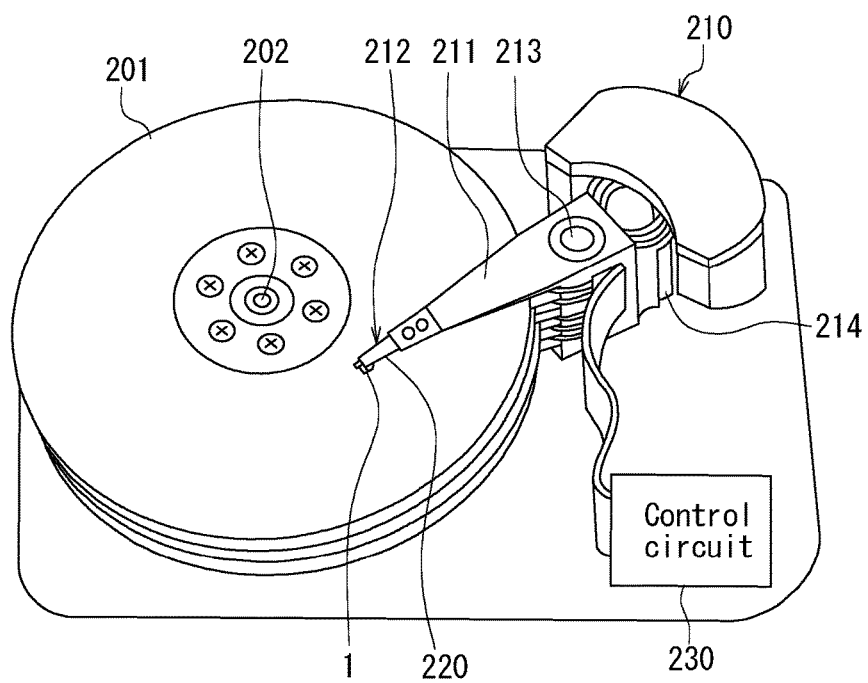
FIG. 10 is a perspective view showing a magnetic recording device of the embodiment of the invention.

A preferred embodiment of the present invention will now be described in detail with reference to the drawings. First, reference is made to FIG. 10 to describe a magnetic recording device incorporating a thermally-assisted magnetic recording head according to the embodiment of the invention. FIG. 10 shows a magnetic disk drive as the magnetic recording device. As shown in FIG. 10, the magnetic disk drive includes a plurality of magnetic disks 201 serving as a plurality of magnetic recording media, and a spindle motor 202 for rotating the magnetic disks 201. The magnetic disks 201 of the present embodiment are intended for perpendicular magnetic recording. Each magnetic disk 201 includes a soft magnetic under layer, a middle layer, and a magnetic recording layer (perpendicular magnetization layer) which are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a thermally-assisted magnetic recording head 1 according to the present embodiment, and a suspension 220 for supporting the thermally-assisted magnetic recording head 1.

The assembly carriage device 210 is a device for positioning the thermally-assisted magnetic recording heads 1 on tracks which are concentrically formed in the magnetic recording layer of each magnetic disk 201. The tracks are the area of the magnetic recording layer where to write data. Each track is provided with a plurality of record bits formed in a row. The assembly carriage device 210 further has a pivot bearing shaft 213 and a voice coil motor 214. The plurality of driving arms 211 are stacked in a direction along the pivot bearing shaft 213 and are configured to be driven by the voice coil motor 214 to thereby pivot about the shaft 213.

The magnetic disk drive further includes a control circuit 230. The control circuit 230 controls the read and write operations of the thermally-assisted magnetic recording head 1 and also controls the light-emitting operation of a laser diode 19 (see FIG. 1). As will be discussed in detail later, the laser diode 19 is an excitation light source for emitting excitation light described later, and is included in the thermally-assisted magnetic recording head 1.

Figure 11:
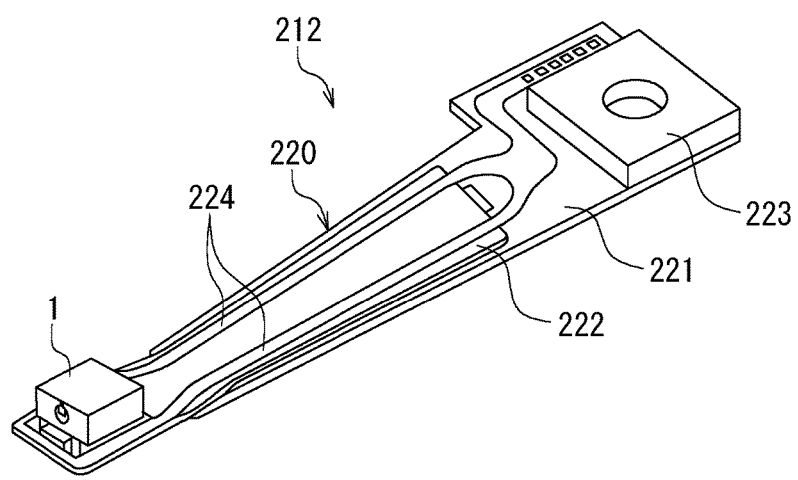
FIG. 11 is a perspective view showing a head gimbal assembly of the embodiment of the invention.

FIG. 11 is a perspective view showing the head gimbal assembly 212 of FIG. 10. As described above, the head gimbal assembly 212 includes the thermally-assisted magnetic recording head 1 and the suspension 220. The suspension 220 has a load beam 221, a flexure 222 secured to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is secured to the flexure 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

Figure 1:
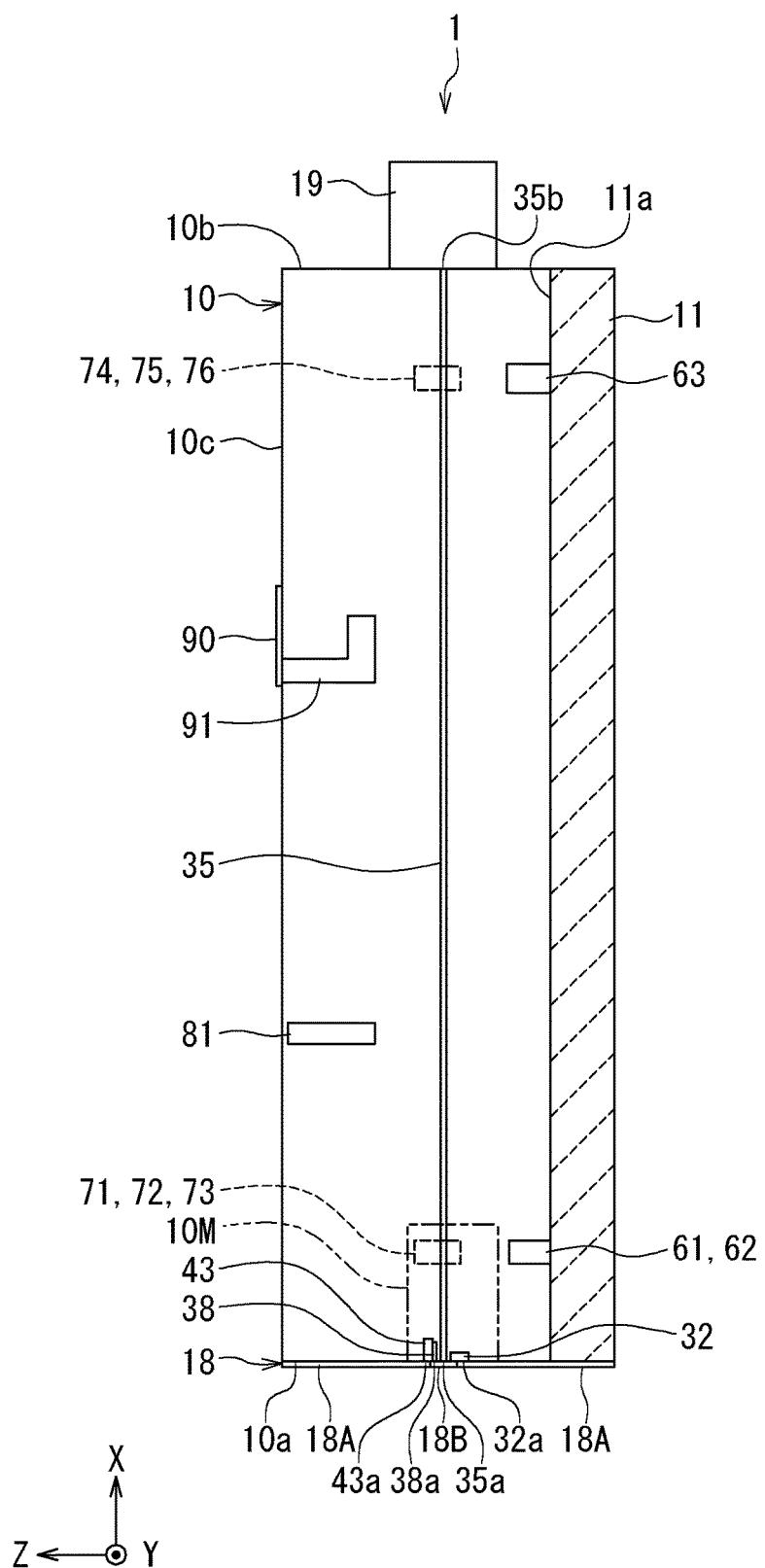
FIG. 1 is a cross-sectional view showing a thermally-assisted magnetic recording head according to an embodiment of the invention.

The general configuration of the thermally-assisted magnetic recording head 1 according to the embodiment will now be described with reference to FIG. 1. FIG. 1 is a cross-sectional view showing the thermally-assisted magnetic recording head 1. The thermally-assisted magnetic recording head 1 includes a head body 10, a protective film 18, and the laser diode 19 mentioned above. The head body 10 has a medium facing surface 10a configured to face the magnetic disk 201, a rear surface 10b opposite to the medium facing surface 10a, and a top surface 10c. The medium facing surface 10a is processed to achieve an appropriate flying height of the thermally-assisted magnetic recording head 1 from the magnetic disk 201. The protective film 18 covers the medium facing surface 10a. The laser diode 19 is mounted on the rear surface 10b.

The head body 10 includes a substrate 11. The substrate 11 is formed of a ceramic material such as aluminum oxide-titanium carbide ($Al_2O_3$-TiC), and has an element-forming surface 11a. The element-forming surface 11a is perpendicular to the medium facing surface 10a. The entire head body 10 excluding the substrate 11 lies on the element-forming surface 11a. The entire head body 10 excluding the substrate 11 includes a plurality of components of the head body 10. The plurality of components include a plurality of head components to be described later.

For the positions of the plurality of components of the head body 10, the term "above" as used herein refers to positions located in a direction perpendicular to the element-forming surface 11a and away from the element-forming surface 11a with respect to a reference position, and "below" refers to positions located in the opposite direction to the aforementioned direction. For each of layers included in the head body 10, the term "bottom surface" as used therein refers to the surface closer to the element-forming surface 11a, and "top surface" refers to the surface farther from the element-forming surface 11a.

Further, let us define X direction, Y direction, Z direction, −X direction, −Y direction, and −Z direction as follows. The X direction is the direction perpendicular to the medium facing surface 10a and from the medium facing surface 10a to the rear surface 10b. The Y direction is the direction parallel to the medium facing surface 10a and the element-forming surface 11a and out of the drawing sheet of FIG. 1. The Z direction is the direction perpendicular to the element-forming surface 11a and away from the element-forming surface 11a. The −X, −Y and −Z directions are opposite to the X, Y and Z directions, respectively. As viewed from the head body 10, the magnetic disk 201 travels in the Z direction. An end of the medium facing surface 10a in the −Z direction is the air inflow end (leading end) of the head body 10. An end of the medium facing surface 10a in the Z direction is the air outflow end (trailing end) of the head body 10. The track width direction is parallel to the Y direction. The top surface 10c lies at the end of the head body 10 in the Z direction.

The head body 10 further includes a plurality of pad-shaped terminals 90 provided on the top surface 10c and a plurality of columnar conductor sections 91 provided inside the head body 10. The plurality of pad-shaped terminals 90 are electrically connected to the plurality of pad-shaped terminals of wiring member 224 shown in FIG. 11. The plurality of columnar conductor sections 91 are electrically connected to the plurality of pad-shaped terminals 90. Some of the plurality of components of the head body 10 are electrically connected to the plurality of columnar conductor sections 91.

The head body 10 further includes the plurality of head components mentioned above, an insulating section formed of an insulating material, and at least one main light-blocking section. The head body 10 may further include at least one subsidiary light-blocking section. The plurality of head components are components particularly used for writing data on the magnetic disk 201, among the plurality of components of the head body 10. The plurality of head components include a main pole 43 for producing a write magnetic field, a waveguide 35, a plasmon generator 38, and a leading shield 32. The main pole 43 has a front end face 43a located in the medium facing surface 10a. The leading shield 32 has a front end face 32a located in the medium facing surface 10a. In FIG. 1 the dashed-line area designated 10M represents the principal part of the head body 10 including the main pole 43, the plasmon generator 38 and the leading shield 32.

The waveguide 35 extends perpendicularly to the medium facing surface 10a, i.e., in the X direction. The waveguide 35 has an exit end face 35a located in the medium facing surface 10a and an entrance end face 35b opposite to the exit end face 35a. The laser diode 19 emits excitation laser light to allow it to enter the entrance end face 35b. The waveguide 35 is configured to allow the excitation laser light having entered the entrance end face 35b to propagate through the waveguide 35 and exit from the exit end face 35a. The laser light emitted by the laser diode 19 has a wavelength of 808 nm, for example.

The head body 10 may further include a dummy waveguide 135. The dummy waveguide 135 is shown in FIG. 3 to FIG. 6B to be described later. The dummy waveguide 135 is used for alignment of the laser diode 19 in the course of manufacture of the thermally-assisted magnetic recording head 1. The dummy waveguide 135 is disposed to be offset from the waveguide 35 in the −Y direction, for example. The dummy waveguide 135 is of the same shape as the waveguide 35. More specifically, the dummy waveguide 135 extends perpendicularly to the medium acing surface 10a, i.e., in the X direction. The dummy waveguide 135 has an exit end face located in the medium facing surface 10a and an entrance end face opposite to the exit end face.

The plasmon generator 38 has a near-field light generating surface 38a located in the medium facing surface 10a. The plasmon generator 38 is configured to excite surface plasmons thereon and generate near-field light from the surface plasmons at the near-field light generating surface 38a on the principle to be described later. The front end face 32a of the leading shield 32, the exit end face 35a, the near-field light generating surface 38a, and the front end face 43a of the main pole 43 are arranged in this order in the Z direction.

Figure 2:
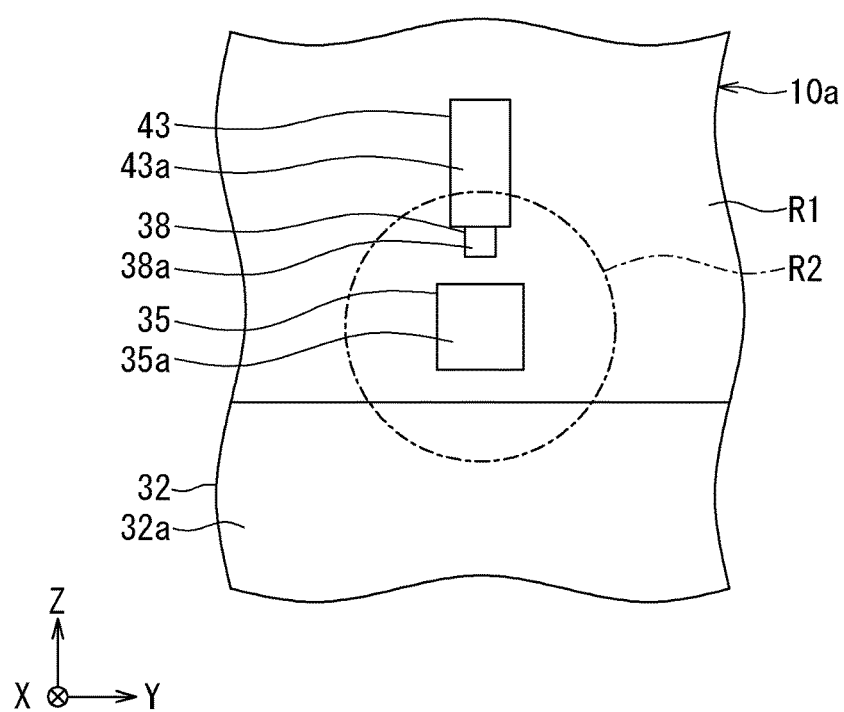
FIG. 2 is a front view showing a second region and the vicinity thereof in a medium facing surface of the embodiment of the invention.

The medium facing surface 10a includes a first region R1 and a second region R2. FIG. 2 shows the second region R2 and the vicinity thereof. The second region R2 is the region enclosed by the alternate long and short dashed lines in FIG. 2. As shown in FIG. 2, the second region R2 includes at least the exit end face 35a and the near-field light generating surface 38a. The second region R2 preferably further includes at least part of the front end face 43a of the main pole 43. The second region R2 may further include at least part of the front end face 32a of the leading shield 32. The first region R1 is outside the region enclosed by the alternate long and short dashed lines in FIG. 2. As shown in FIG. 2, the first region R1 includes neither of the exit end face 35a and the near-field light generating surface 38a. When the second region R2 includes at least part of each of the front end faces 43a and 32a, the first region R1 includes neither of the exit end face 35a and the near-field light generating surface 38a and neither of the at least part of the front end face 43a and the at least part of the front end face 32a.

As shown in FIG. 1, the protective film 18 includes a first portion 18A covering the first region R1 and a second portion 18B covering the second region R2. The first portion 18A and the second portion 18B will be described in detail later.

The at least one main light-blocking section and the at least one subsidiary light-blocking section are embedded in the insulating section. The at least one main light-blocking section and the at least one subsidiary light-blocking section are lower in transmittance for light of any wavelength within the range of 10 to 900 nm than the waveguide 35 and the insulating section. The range of 10 to 900 nm is the range within which the wavelength of exposure light to be described later can fall.

In the present embodiment, the at least one main light-blocking section and the at least one subsidiary light-blocking section are formed of metal. The metal may be nonmagnetic metal such as copper, or magnetic metal such as NiFe or FeCoNi. The at least one main light-blocking section is located to intersect at least one imaginary straight line connecting the entrance end face 35b and the first region R1. The at least one imaginary straight line intersects none of the plurality of head components.

The distance from the medium facing surface 10a to the at least one main light-blocking section is smaller than or equal to one-half the distance from the medium facing surface 10a to the entrance end face 35b. The distance from the medium facing surface 10a to the at least one subsidiary light-blocking section is greater than one-half the distance from the medium facing surface 10a to the entrance end face 35b.

In the present embodiment, the at least one main light-blocking section is a plurality of main light-blocking sections, and the at least one subsidiary light-blocking section is a plurality of subsidiary light-blocking sections. The plurality of main light-blocking sections and the plurality of subsidiary light-blocking sections will now be described in detail with reference to FIG. 1 and FIGS. 3 to 6B. In the present embodiment, the plurality of main light-blocking sections include two lower main light-blocking sections 61 and 62, three middle main light-blocking sections 71, 72 and 73, and one upper main light-blocking section 81. The plurality of subsidiary light-blocking sections include one lower subsidiary light-blocking section 63 and three middle subsidiary light-blocking sections 74, 75 and 76.

Figure 3:
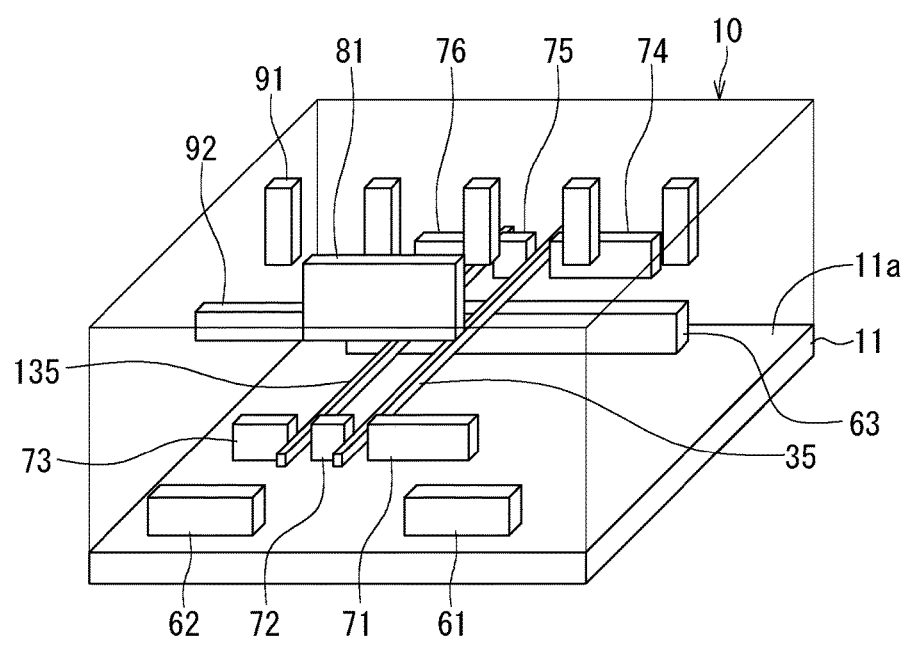
FIG. 3 is a perspective view showing a plurality of main light-blocking sections and a plurality of subsidiary light-blocking sections of the embodiment of the invention.
Figure 4A:
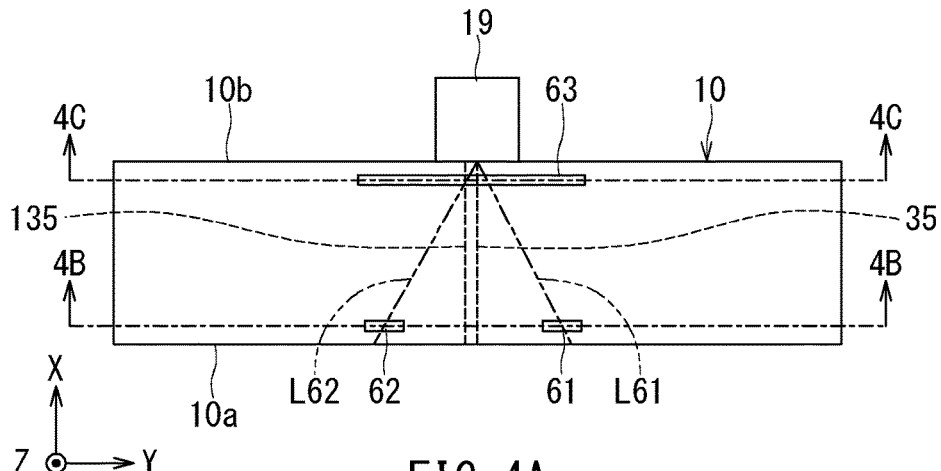
FIG. 4A is a plan view showing two lower main light-blocking sections and one lower subsidiary light-blocking section of the embodiment of the invention.
Figure 4B:
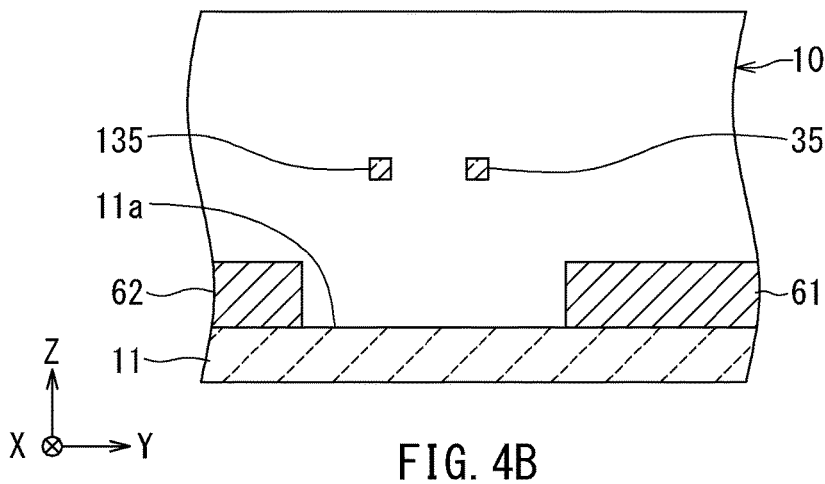
FIG. 4B is a cross-sectional view showing a portion of a cross section taken along line 4B-4B of FIG. 4A.
Figure 4C:
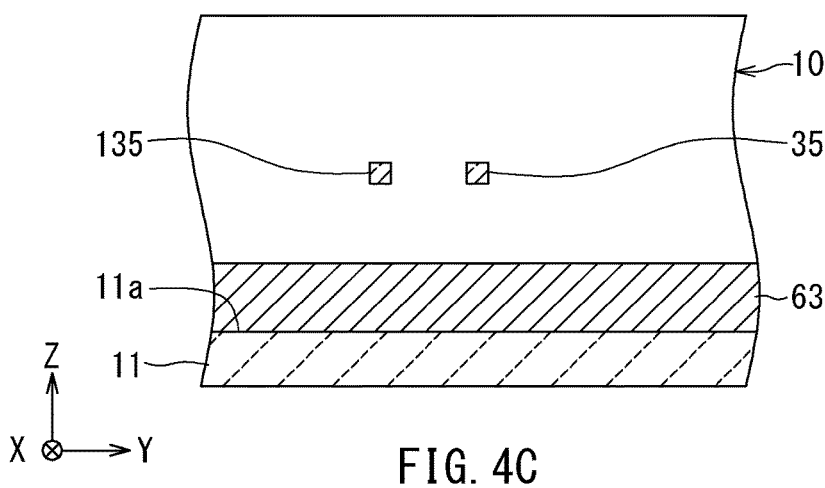
FIG. 4C is a cross-sectional view showing a portion of a cross section taken along line 4C-4C of FIG. 4A.

FIG. 3 is a perspective view showing the plurality of main light-blocking sections and the plurality of subsidiary light-blocking sections. FIG. 4A is a plan view showing the lower main light-blocking sections 61 and 62 and the lower subsidiary light-blocking section 63. FIG. 4B is a cross-sectional view showing a portion of a cross section taken along line 4B-4B of FIG. 4A. FIG. 4C is a cross-sectional view showing a portion of a cross section taken along line 4C-4C of FIG. 4A. The lower main light-blocking sections 61 and 62 and the lower subsidiary light-blocking section 63 are located closer to the element-forming surface 11a than are the waveguide 35 and the dummy waveguide 135. The lower main light-blocking sections 61 and 62 and the lower subsidiary light-blocking section 63 may be connected to the substrate 11. The lower main light-blocking sections 61 and 62 and the lower subsidiary light-blocking section 63 may be further connected to the ground via the substrate 11. FIG. 4A shows an imaginary straight line L61 connecting the entrance end face 35b and the first region R1 and intersecting the lower main light-blocking section 61, and an imaginary straight line L62 connecting the entrance end face 35b and the first region R1 and intersecting the lower main light-blocking section 62.

In the example shown in FIG. 4A, the lower main light-blocking sections 61 and 62 are located near the medium facing surface 10a. The lower main light-blocking section 61 is located such that the waveguide 35 is interposed between the lower main light-blocking section 61 and the dummy waveguide 135 as viewed from above. The lower main light-blocking section 62 is located such that the dummy waveguide 135 is interposed between the lower main light-blocking section 62 and the waveguide 35 as viewed from above. The lower subsidiary light-blocking section 63 is located near the rear surface 10b. The lower subsidiary light-blocking section 63, as viewed from above, extends along the Y direction to intersect the waveguide 35 and the dummy waveguide 135.

Figure 5A:
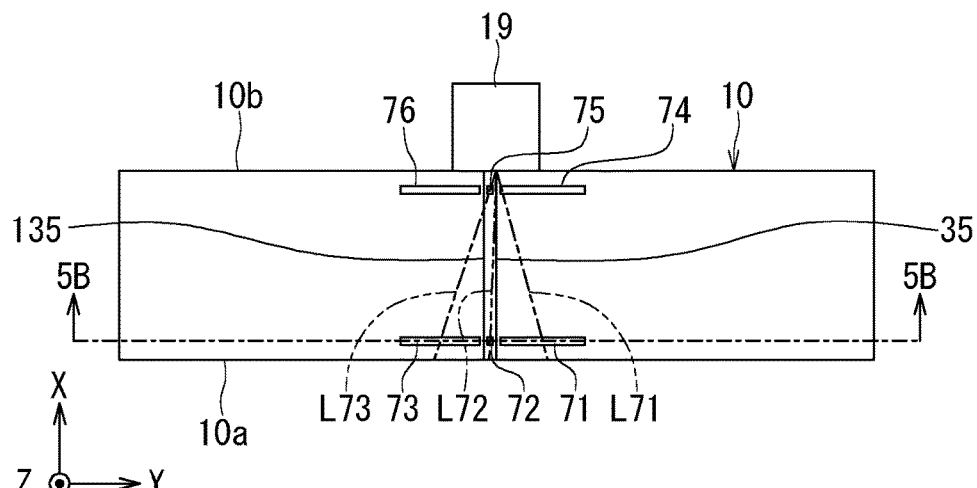
FIG. 5A is a plan view showing three middle main light-blocking sections and three middle subsidiary light-blocking sections of the embodiment of the invention.
Figure 5B:
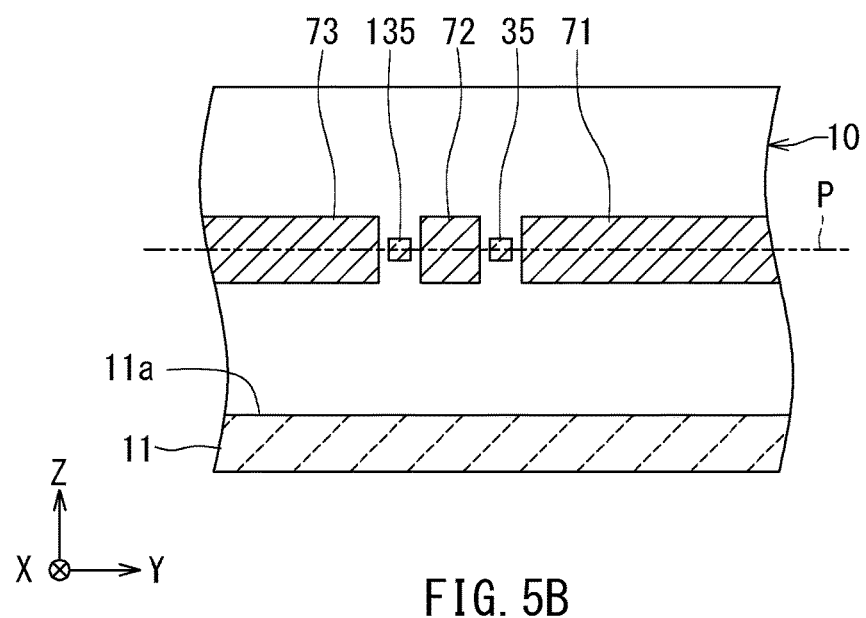
FIG. 5B is a cross-sectional view showing a portion of a cross section taken along line 5B-5B of FIG. 5A.

FIG. 5A is a plan view showing the middle main light-blocking sections 71, 72 and 73 and the middle subsidiary light-blocking sections 74, 75 and 76. FIG. 5B is a cross-sectional view showing a portion of a cross section taken along line 5B-5B of FIG. 5A. As shown in FIG. 5B, let us assume an imaginary plane P intersecting the waveguide 35 and the dummy waveguide 135 and parallel to the element-forming surface 11a. The middle main light-blocking sections 71 to 73 and the middle subsidiary light-blocking sections 74 to 76 are located to intersect the aforementioned imaginary plane P. FIG. 5A shows an imaginary straight line L71 connecting the entrance end face 35b and the first region R1 and intersecting the middle main light-blocking section 71, an imaginary straight line L72 connecting the entrance end face 35b and the first region R1 and intersecting the middle main light-blocking section 72, and an imaginary straight line L73 connecting the entrance end face 35b and the first region R1 and intersecting the middle main light-blocking section 73.

In the example shown in FIG. 5A, the middle main light-blocking sections 71 to 73 are located near the medium facing surface 10a. The middle main light-blocking section 72 is located between the waveguide 35 and the dummy waveguide 135 as viewed from above. The middle main light-blocking section 71 is located such that the waveguide 35 is interposed between the middle main light-blocking section 71 and the middle main light-blocking section 72 as viewed from above. The middle main light-blocking section 73 is located such that the dummy waveguide 135 is interposed between the middle main light-blocking section 73 and the middle main light-blocking section 72 as viewed from above.

The middle subsidiary light-blocking sections 74 to 76 are located near the rear surface 10b. The middle subsidiary light-blocking section 75 is located between the waveguide 35 and the dummy waveguide 135 as viewed from above. The middle subsidiary light-blocking section 74 is located such that the waveguide 35 is interposed between the middle subsidiary light-blocking section 74 and the middle subsidiary light-blocking section 75 as viewed from above. The middle subsidiary light-blocking section 76 is located such that the dummy waveguide 135 is interposed between the middle subsidiary light-blocking section 75 and the middle subsidiary light-blocking section 76 as viewed from above.

Figure 6A:
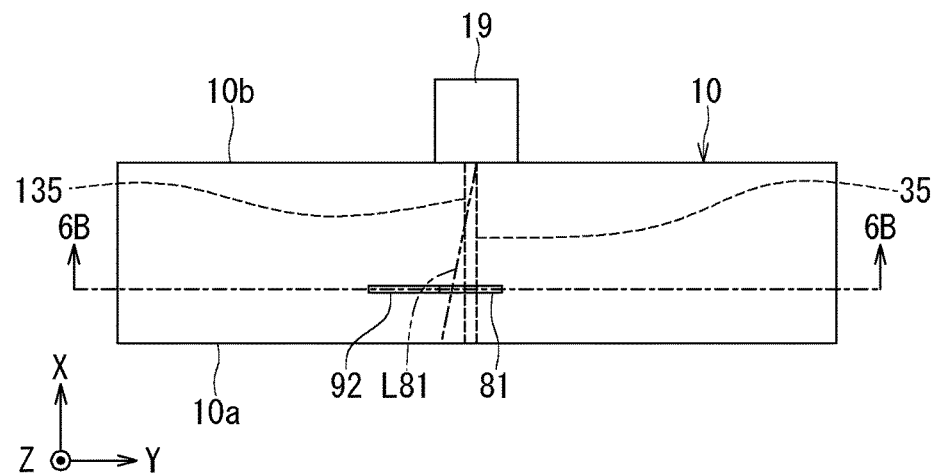
FIG. 6A is a plan view showing one upper main light-blocking section of the embodiment of the invention.
Figure 6B:
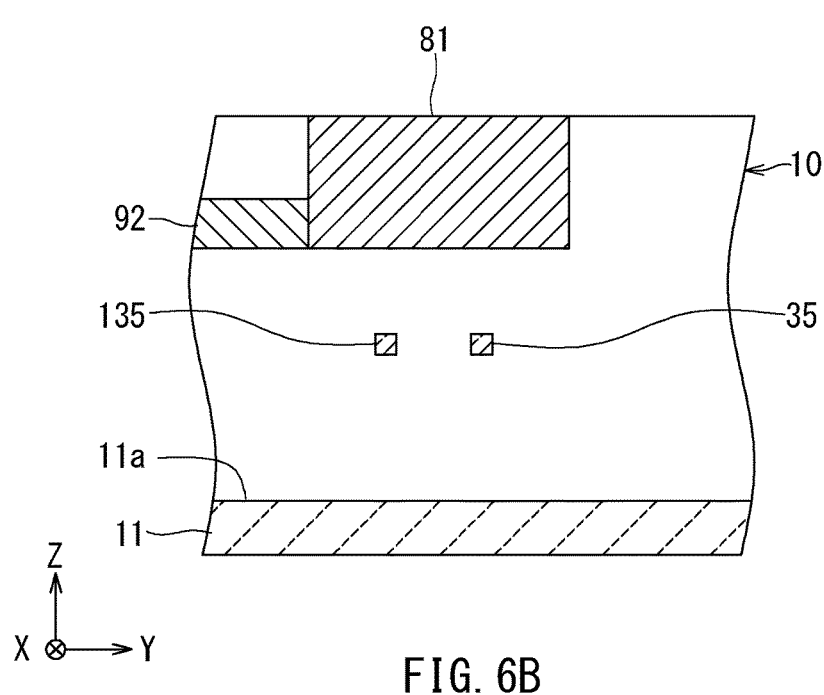
FIG. 6B is a cross-sectional view showing a portion of a cross section taken along line 6B-6B of FIG. 6A.

FIG. 6A is a plan view showing the upper main light-blocking section 81. FIG. 6B is a cross-sectional view showing a portion of a cross section taken along line 6B-6B of FIG. 6A. The upper main light-blocking section 81 is located farther from the element-forming surface 11a than are the waveguide 35 and the dummy waveguide 135. FIG. 6A shows an imaginary straight line L81 connecting the entrance end face 35b and the first region R1 and intersecting the upper main light-blocking section 81.

The upper main light-blocking section 81, as viewed from above, extends along the Y direction to intersect the waveguide 35 and the dummy waveguide 135. The head body 10 may further include: a conductor section 92 electrically connected to the upper main light-blocking section 81 as shown in FIG. 3; a columnar conductor section (not illustrated) provided inside the head body 10 and electrically connected to the conductor section 92; and a pad-shaped terminal (not illustrated) provided on the top surface 10c of the head body 10 and electrically connected to the non-illustrated columnar conductor section. The upper main light-blocking section 81 may be connected to the ground via the conductor section 92, the non-illustrated columnar conductor section and the non-illustrated pad-shaped terminal.

Figure 7:
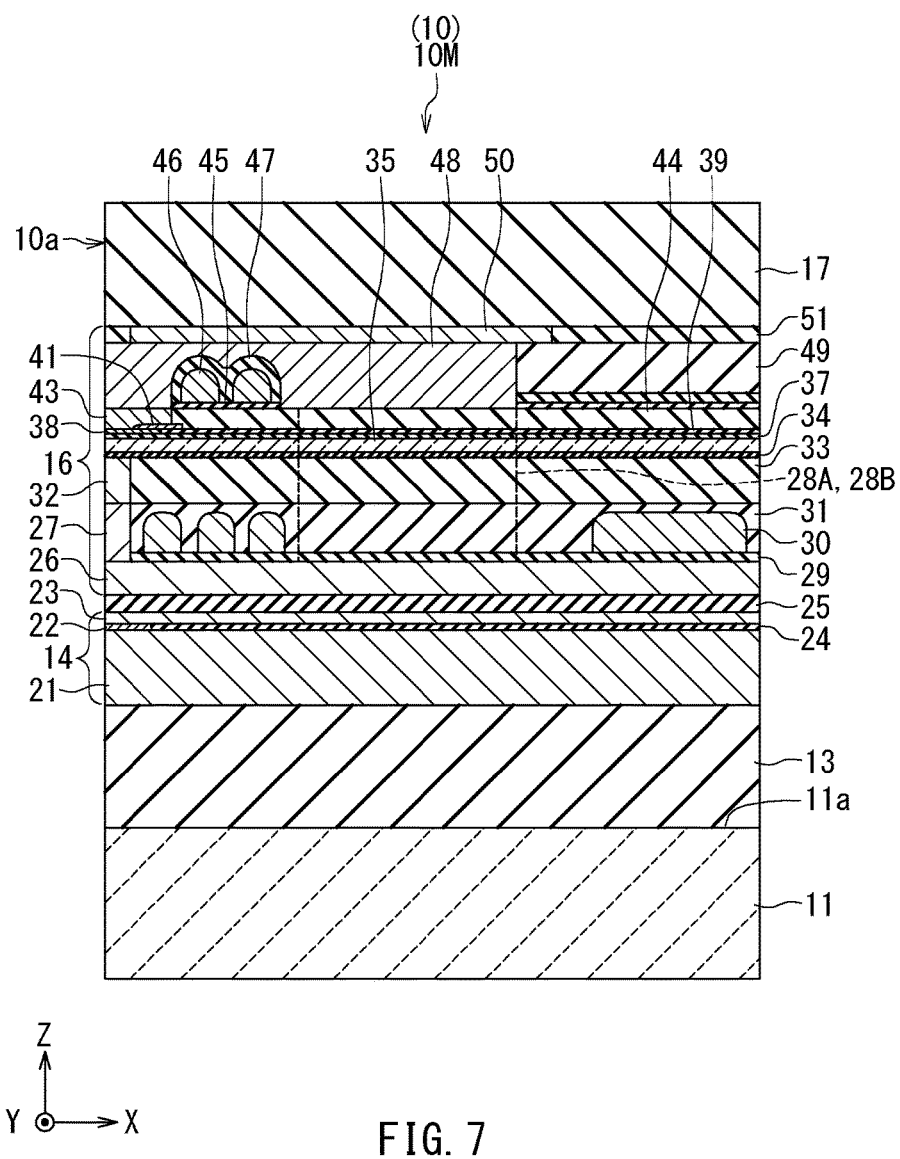
FIG. 7 is a cross-sectional view showing a principal part of the head body and the vicinity thereof in the embodiment of the invention.
Figure 8:
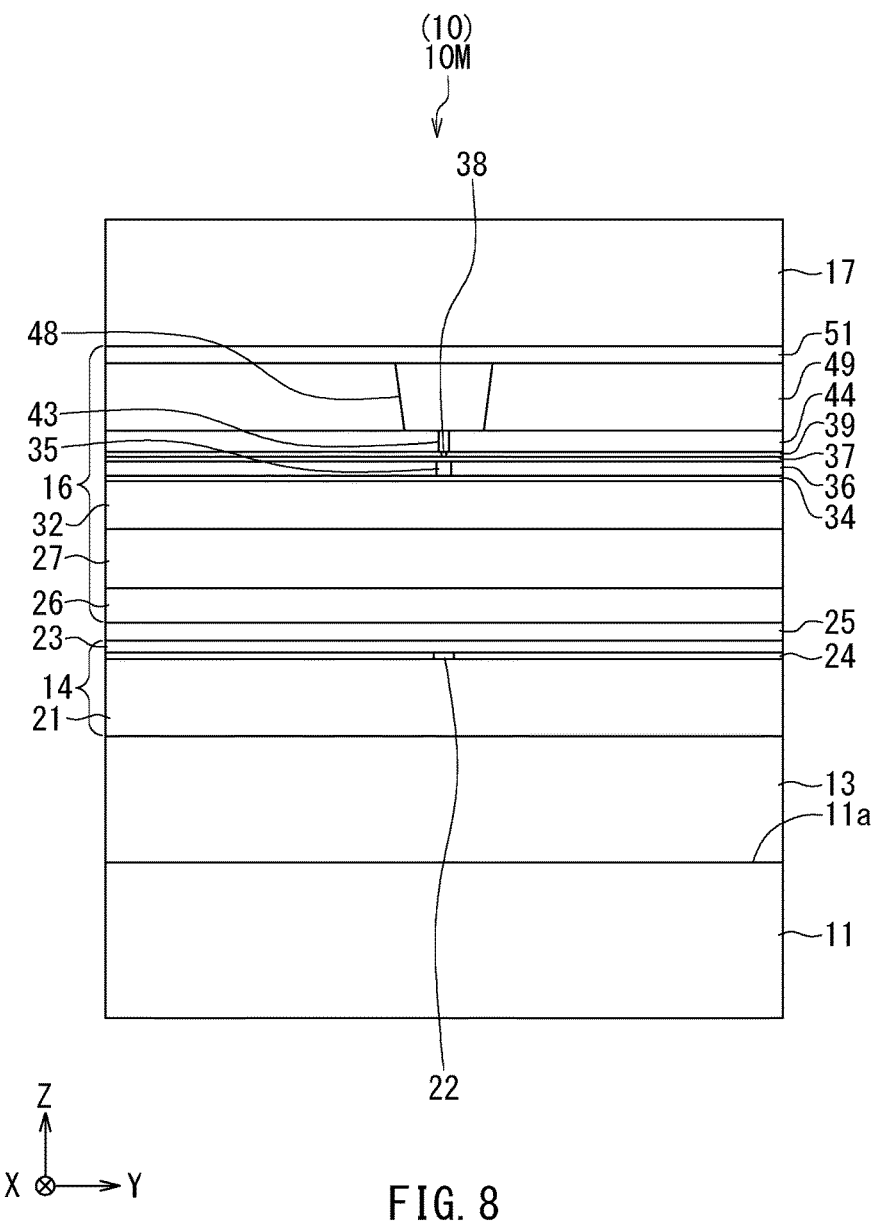
FIG. 8 is a front view showing part of the medium facing surface of the embodiment of the invention.
Figure 9:
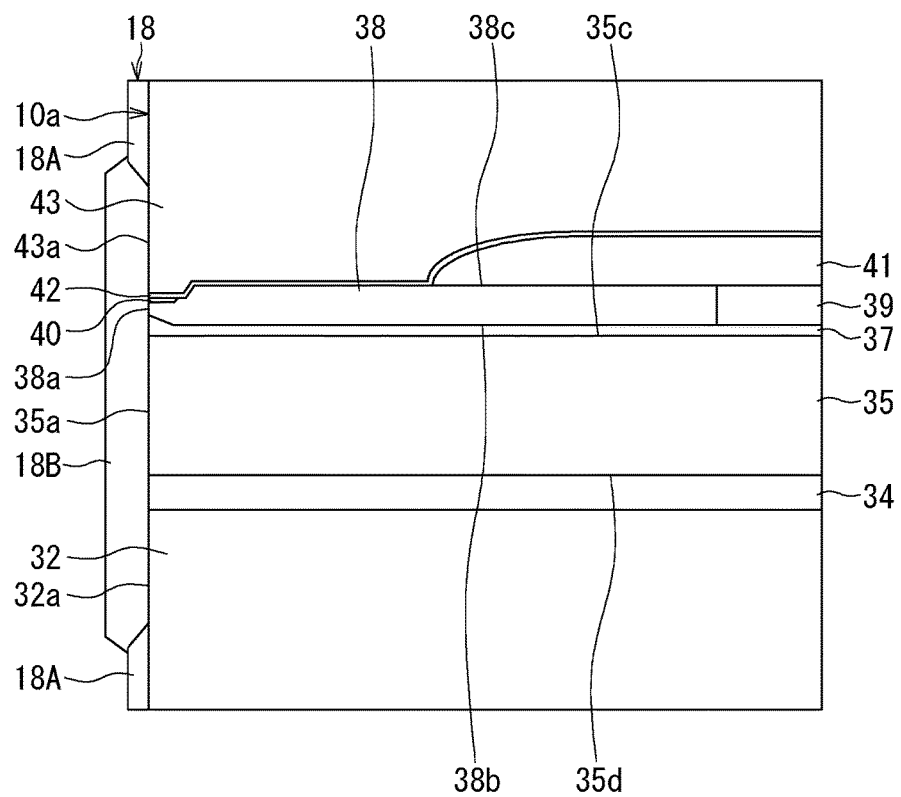
FIG. 9 is a cross-sectional view showing a main pole, a plasmon generator and a waveguide of the embodiment of the invention.

Components of the head body 10 other than the plurality of main light-blocking sections and subsidiary light-blocking sections will now be described in detail with reference to FIG. 7 to FIG. 9. FIG. 7 is a cross-sectional view showing the principal part 10M of the head body 10 and the vicinity thereof. FIG. 8 is a front view showing part of the medium facing surface 10a. FIG. 9 is a cross-sectional view showing the main pole 43, the waveguide 35 and the plasmon generator 38.

As shown in FIG. 7, the head body 10 includes an insulating layer 13 disposed on the element-forming surface 11a, and a read head unit 14, a write head unit 16 and a protective layer 17 stacked in this order on the insulating layer 13. The write head unit 16 includes the plurality of head components mentioned previously. The plurality of head components include the main pole 43, the waveguide 35, the plasmon generator 38 and the leading shield 32 as described previously, and further include coils 30 and 46, a coupling layer 27, a return yoke layer 26, coupling sections 28A and 28B, a coupling layer 48, and a yoke layer 50. The insulating layer 13 and the protective layer 17 are each formed of an insulating material such as $Al_2O_3$ (hereinafter, also referred to as alumina).

The at least one main light-blocking section may be connected to at least one of the head components. In such a case, the at least one main light-blocking section and the at least one of the head components can be formed integrally from the same material.

The at least one subsidiary light-blocking section may be connected to at least one other component, such as one of the columnar conductor sections 91. In such a case, the at least one subsidiary light-blocking section and the at least one other component can be formed integrally from the same material.

The read head unit 14 includes: a bottom shield layer 21 lying on the insulating layer 13; an MR element 22 lying on the bottom shield layer 21; a top shield layer 23 lying on the MR element 22; an insulating layer 52 lying on the insulating layer 13 and surrounding the bottom shield layer 21; an insulating layer 24 provided between the bottom shield layer 21 and the top shield layer 23 and surrounding the MR element 22; and an insulating layer 53 lying on the insulating layer 24 and surrounding the top shield layer 23. The insulating layer 52 is shown in, for example, FIG. 12F to be described later. The insulating layer 53 is shown in, for example, FIG. 13A to be described later. The bottom shield layer 21 and the top shield layer 23 are each formed of a soft magnetic material. The insulating layers 24, 52 and 53 are each formed of an insulating material such as alumina.

An end of the MR element 22 is located in the medium facing surface 10a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the plane of layers constituting the GMR element or the current-perpendicular-to-plane (CPP) type in which the sense current is fed in a direction generally perpendicular to the plane of layers constituting the GMR element. In the case where the MR element 22 is a TMR element or a CPP-type GMR element, the bottom shield layer 21 and the top shield layer 23 may also serve as electrodes for feeding the sense current to the MR element 22. In the case where the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head body 10 further includes an insulating layer 25 lying on the top shield layer 23 and the insulating layer 53. The insulating layer 25 is formed of an insulating material such as alumina.

The write head unit 16 is intended for perpendicular magnetic recording. The write head unit 16 includes the main pole 43, the waveguide 35, the plasmon generator 38 and the leading shield 32. The write head unit 16 further includes the return yoke layer 26 lying on the insulating layer 25, and an insulating layer 54 lying on the insulating layer 25 and surrounding the return yoke layer 26. The insulating layer 54 is shown in, for example, FIG. 13A to be described later. The return yoke layer 26 is formed of a soft magnetic material. The insulating layer 54 is formed of an insulating material such as alumina.

The write head unit 16 further includes: the coupling layer 27 lying on a first portion of the top surface of the return yoke layer 26, the first portion being located near the medium facing surface 10a; the two coupling sections 28A and 28B lying on two second portions of the top surface of the return yoke layer 26, the two second portions being located away from the medium facing surface 10a; and an insulating layer 29 lying on the insulating layer 54 and a portion of the top surface of the return yoke layer 26 other than the first and second portions. The coupling layer 27 and the coupling sections 28A and 28B are each formed of a soft magnetic material. The insulating layer 29 is formed of an insulating material such as alumina. Each of the coupling sections 28A and 28B includes a first layer lying on the return yoke layer 26, and a second and a third layer stacked in this order on the first layer. The first layer of the coupling section 28A and the first layer of the coupling section 28B are arranged to be adjacent in the Y direction.

The write head unit 16 further includes the coil 30 lying on the insulating layer 29, and an insulating layer 31 covering the coil 30. The coil 30 is planar spiral-shaped and wound around the first layers of the coupling sections 28A and 28B. The coil 30 produces a magnetic field corresponding to data to be written on the magnetic disk 201. The coil 30 is formed of a conductive material such as copper. The insulating layer 31 is formed of an insulating material such as alumina. The first layers of the coupling sections 28A and 28B are embedded in the insulating layers 29 and 31.

The leading shield 32 lies on the coupling layer 27. The write head unit 16 further includes an insulating layer 33 surrounding the leading shield 32. The leading shield 32 is formed of a soft magnetic material. The insulating layer 33 is formed of an insulating material such as alumina. The second layers of the coupling sections 28A and 28B are embedded in the insulating layer 33.

The write head unit 16 further includes insulating layers 34, 36 and 37. The insulating layer 34 lies on the leading shield 32 and the insulating layer 33. The waveguide 35 lies on the insulating layer 34. The insulating layer 36 lies on the insulating layer 34 and surrounds the waveguide 35. The insulating layer 37 lies on the waveguide 35 and the insulating layer 36.

As shown in FIG. 9, the waveguide 35 has an evanescent light generating surface 35c serving as a top surface, a bottom surface 35d, and two side surfaces, in addition to the exit end face 35a and the entrance end face 35b. The evanescent light generating surface 35c generates evanescent light from the light propagating through the waveguide 35.

The waveguide 35 is formed of a dielectric material that transmits the laser light. An example of the material of the waveguide 35 is tantalum oxide such as $Ta_2O_5$, TaO, or $TaO_2$. At least portions of the insulating layers 34, 36 and 37 contacting the waveguide 35 are formed of a cladding material having a refractive index lower than that of the waveguide 35. Examples of cladding materials usable for the insulating layers 34, 36 and 37 are silicon oxide such as $SiO_2$ and aluminum oxide such as $Al_2O_3$.

Each of the insulating layers 34, 36 and 37 may entirely be formed of a cladding material, or only a portion thereof contacting the waveguide 35 may be formed of a cladding material. The insulating layer 36, in particular, may include a portion formed of the same material as the waveguide 35.

In the case where the head body 10 includes the dummy waveguide 135 (see FIG. 3 to FIG. 6B), the dummy waveguide 135 is placed on the insulating layer 34 at a location different from the waveguide 35. The insulating layer 36 surrounds the waveguide 35 and the dummy waveguide 135. The insulating layer 37 lies on the waveguide 35, the insulating layer 36 and the dummy waveguide 135. The dummy waveguide 135 is formed of the same material as the waveguide 35, for example.

The plasmon generator 38 lies on the insulating layer 37. As shown in FIG. 9, the plasmon generator 38 has a bottom surface 38b and a top surface 38c in addition to the near-field light generating surface 38a. The bottom surface 38b includes an inclined portion and a flat portion, the inclined portion being closer to the medium facing surface 10a than is the flat portion. The inclined portion has a first end located in the medium facing surface 10a and a second end opposite to the first end. The flat portion is connected to the second end. The inclined portion is inclined such that the second end is located on the rear side in the Z direction relative to the first end. The flat portion of the bottom surface 38b extends substantially perpendicularly to the medium facing surface 10a.

The top surface 38c includes a first portion located near the medium facing surface 10a, and a second portion which is located farther from the medium facing surface 10a than is the first portion and located farther from the element-forming surface 11a than is the first portion. The first portion and the second portion of the top surface 38c extend substantially perpendicularly to the medium facing surface 10a.

The plasmon generator 38 is formed of a conductive material such as metal. For example, the plasmon generator 38 may be formed of one element selected from the group consisting of Pd, Pt, Rh, Ir, Ru, Au, Ag, Cu, and Al, or of an alloy composed of two or more of these elements.

The write head unit 16 further includes an insulating layer 39 lying on the insulating layer 37 and surrounding the plasmon generator 38, an insulating layer 40 lying on the first portion of the top surface 38c of the plasmon generator 38, and a heat sink 41 lying on the second portion of the top surface 38c of the plasmon generator 38 and the top surface of the insulating layer 39. FIGS. 7 and 8 omit the illustration of the insulating layer 40. The insulating layers 39 and 40 are formed of SiO$_2$, for example. The heat sink 41 is formed of the same material as the plasmon generator 38, for example.

The write head unit 16 further includes a nonmagnetic metal film 42 lying on the plasmon generator 38, the insulating layers 39 and 40 and the heat sink 41. FIGS. 7 and 8 omit the illustration of the nonmagnetic metal film 42. The nonmagnetic metal film 42 is formed, for example, Rh, Ru, Pd, Pt or Ir.

The main pole 43 is disposed on the nonmagnetic metal film 42 in such a manner as to ride over the plasmon generator 38, the insulating films 39 and 40 and the heat sink 41. The main pole 43 is formed of, for example, a magnetic metal material such as FeCo or FeCoNi.

The write head unit 16 further includes an insulating layer 44 provided around the main pole 43 and the heat sink 41. The insulating layer 44 is formed of an insulating material such as alumina. The third layers of the coupling sections 28A and 28B are embedded in the insulating layers 34, 36, 37, 39 and 44. The third layer of the coupling section 28A and the third layer of the coupling section 28B are located on opposite sides of the waveguide 35 in the track width direction and spaced from the waveguide 35.

The write head unit 16 further includes an insulating layer 45 lying on the insulating layer 44, the coil 46 lying on the insulating layer 45, an insulating layer 47 covering the coil 46, and the coupling layer 48 lying on the main pole 43, the coupling sections 28A and 28B and the insulating layers 44 and 47. The coil 46 is planar spiral-shaped and wound around a portion of the coupling layer 48 lying on the coupling sections 28A and 28B. The coil 46 produces a magnetic field corresponding to data to be written on the magnetic disk 201. The coil 46 is formed of a conductive material such as copper. The coupling layer 48 is formed of a soft magnetic material. The insulating layers 45 and 47 are each formed of an insulating material such as alumina.

The write head unit 16 further includes an insulating layer 49 around the coupling layer 48, the yoke layer 50 on the coupling layer 48 and the insulating layer 49, and an insulating layer 51 around the yoke layer 50. The yoke layer 50 is formed of a soft magnetic material. The insulating layers 49 and 51 are each formed of an insulating material such as alumina.

In the write head unit 16, a magnetic path for passing magnetic fluxes corresponding to the magnetic fields produced by the coils 30 and 46 is formed by the leading shield 32, the coupling layer 27, the return yoke layer 26, the coupling sections 28A and 28B, the coupling layer 48, the yoke layer 50, and the main pole 43. The main pole 43 passes the magnetic flux corresponding to the magnetic field produced by the coil 30 and the magnetic flux corresponding to the magnetic field produced by the coil 46, and produces a write magnetic field for use to write data on the magnetic disk 201.

As shown in FIG. 7, the protective layer 17 is disposed to cover the write head unit 16. The insulating section of the head body 10 is constituted by the insulating layers 13 and 25, the protective layer 17, the insulating layers in the read head unit 14 and the insulating layers in the write head unit 16.

The protective film 18 will now be described in detail with reference to FIG. 2 and FIG. 9. As previously mentioned, the protective film 18 includes the first portion 18A covering the first region R1 of the medium facing surface 10a and the second portion 18B covering the second region R2 of the medium facing surface 10a. The first portion 18A and the second portion 18B are different from each other in at least one of thickness and material configuration. In the example shown in FIG. 9, the first portion 18A and the second portion 18B are different from each other in thickness. In this example, the second portion 18B is greater in thickness than the first portion 18A.

Now, a description will be given to clarify what is meant by the first portion 18A and the second portion 18B being different from each other in material configuration. Cases where the first portion 18A and the second portion 18B are the same in material configuration include a case where the first portion 18A and the second portion 18B are formed of the same single material, and a case where the first portion 18A and the second portion 18B consist of the same number of stacked layers and the respective corresponding layers of the first portion 18A and the second portion 18B are formed of the same material. Any other case than the aforementioned two cases is where the first portion 18A and the second portion 18B are different from each other in material configuration.

More specifically, cases where the first portion 18A and the second portion 18B are different from each other in material configuration include a case where the first portion 18A and the second portion 18B are formed of respective single materials different from each other, and a case where one of the first and second portions 18A and 18B includes a layer of a material that is not contained in the other.

FIG. 9 illustrates an example in which the first portion 18A and the second portion 18B are formed of respective single materials different from each other. In connection with this example, the material forming the first portion 18A will be referred to as the first material, and the material forming the second portion 18B will be referred to as the second material. The first and second materials are selected from the group consisting of diamond-like carbon (DLC), $TaO_x$, TaAlON, TaON, $SiO_x$, $AlO_x$, $WO_x$, $BC_xN_y$, $AlN_x$, $SiN_x$, $AlO_xN_y$, $SiO_xN_y$, $TiO_x$, $ZrO_x$, $MgO_x$, $ZrO_xN_y$, $YO_x$, $NbO_x$, and $GaN_x$, where x and y each represent any number greater than 0.

As described previously, the second region R2 includes at least the exit end face 35a and the near-field light generating surface 38a, and preferably further includes the front end face 43a. The second portion 18B thus preferably has higher heat resistance than the first portion 18A. Such a condition can be met by making the second portion 18 thicker than the first portion 18A as in the example of FIG. 9. The foregoing condition can also be met by selecting the second material from materials having higher heat resistance than the first material. Combinations of the first material and the second material meeting such a condition include a combination of DLC as the first material and TaAlON as the second material.

The protective film 18 may include an underlayer (not illustrated). The underlayer is provided to lie between the medium facing surface 10a and each of the first and second portions 18A and 18B. The underlayer has the function of enhancing adhesion of the first and second portions 18A and 18B to the medium facing surface 10a. Examples of the material of the underlayer include Ta, Ti and Zr.

The protective film 18 may have any other configuration than that shown in FIG. 9. Other examples of the protective film 18 will be described in detail later.

Reference is now made to FIG. 1 and FIG. 9 to describe the principle of generation of near-field light in the present embodiment and the principle of thermally-assisted magnetic recording using the near-field light. The excitation laser light emitted from the laser diode 19 enters the entrance end face 35b of the waveguide 35, propagates through the waveguide 35 toward the exit end face 35a, and reaches the vicinity of the plasmon generator 38. The evanescent light generating surface 35c of the waveguide 35 generates evanescent light from the excitation laser light propagating through the waveguide 35. More specifically, the excitation laser light is totally reflected at the evanescent light generating surface 35c, and this causes the evanescent light generating surface 35c to generate evanescent light permeating into the insulating layer 37. In the plasmon generator 38, surface plasmons are excited on the bottom surface 38b through coupling with the aforementioned evanescent light. The excited surface plasmons propagate to the near-field light generating surface 38a, and the near-field light generating surface 38a generates near-field light from those surface plasmons.

The near-field light generated at the near-field light generating surface 38a is projected toward the magnetic disk 201, reaches the surface of the magnetic disk 201 and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the main pole 43 for data writing.

A manufacturing method for the thermally-assisted magnetic recording head 1 according to the present embodiment will now be described. The manufacturing method for the thermally-assisted magnetic recording head 1 includes the step of fabricating the head body 10, the step of forming the protective film 18, and the step of mounting the laser diode 19 onto the head body 10. The step of fabricating the head body 10 includes the steps of: forming components of a plurality of head bodies 10, except the substrates 11, on a substrate that includes portions to become the substrates 11 of the plurality of head bodies 10, thereby fabricating a substructure including a plurality of pre-head-body portions arranged in rows, the plurality of pre-head-body portions becoming the plurality of head bodies 10 later, and cutting the substructure to separate the plurality of pre-head-body portions from each other, thereby producing the plurality of head bodies 10. In the step of producing the plurality of head bodies 10, the cut surfaces are polished into the medium facing surfaces 10a.

The step of fabricating the substructure will be described in more detail below with attention focused on a single pre-head-body portion. The step of fabricating the substructure forms the plurality of head components, the insulating section, the at least one main light-blocking section and the at least one subsidiary light-blocking section. In the present embodiment, the at least one main light-blocking section is a plurality of main light-blocking sections, and the at least one subsidiary light-blocking section is a plurality of subsidiary light-blocking sections.

First, reference is made to FIGS. 12A to 12F to describe steps up to the formation of the lower main light-blocking sections 61 and 62 and the lower subsidiary light-blocking section 63. Here, descriptions will be made with the lower main light-blocking section 61 and the lower subsidiary light-blocking section 63 taken as an example. FIGS. 12A to 12F are cross-sectional views each showing part of a stack of layers fabricated in the process of fabrication of the substructure. FIGS. 12A to 12F each show a cross section that intersects the lower main light-blocking section 61 and the lower subsidiary light-blocking section 63 and is perpendicular to the medium facing surface 10a and the element-forming surface 11a. The symbol "ABS" in FIGS. 12A to 12F indicates the position at which the medium facing surface 10a is to be formed.

Figure 12A:
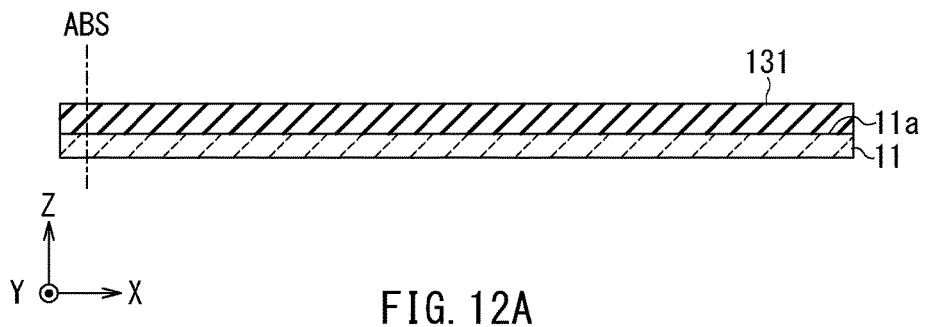
FIG. 12A to FIG. 12F are cross-sectional views showing the step of forming the two lower main light-blocking sections and the lower subsidiary light-blocking section in the step of fabricating a substructure of the embodiment of the invention.
Figure 12B:
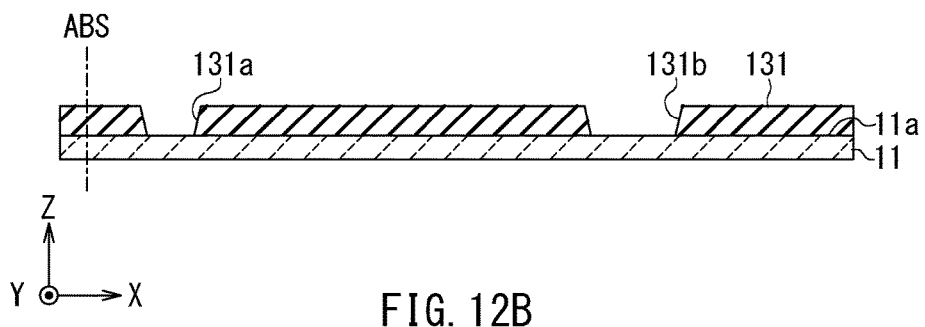

In the step of fabricating the substructure, as shown in FIG. 12A, first formed on the substrate 11 is an insulating layer 131 constituting part of the insulating layer 13 (see FIGS. 7 and 8). Next, as shown in FIG. 12B, a receiving section 131a for receiving part of the lower main light-blocking section 61 and a receiving section 131b for receiving part of the lower subsidiary light-blocking section 63 are formed in the insulating layer 131 by wet etching or reactive ion etching (hereinafter referred to as RIE), for example.

Figure 12C:
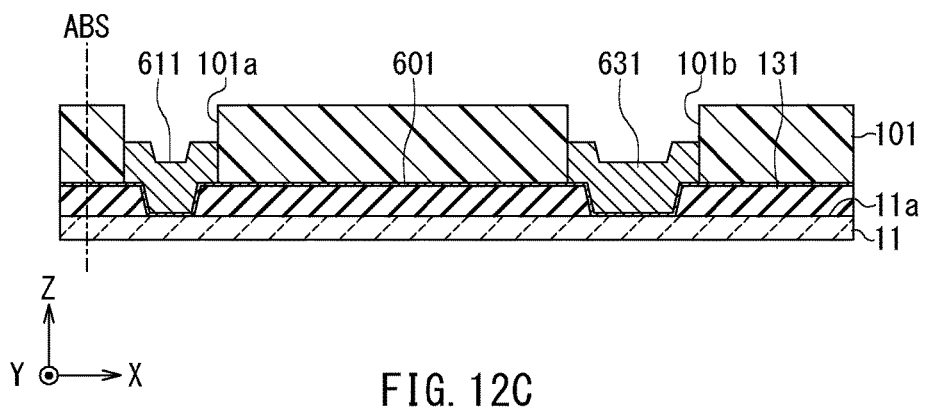

FIG. 12C shows the next step. In this step, first, a seed layer 601 is formed over the entire top surface of the stack. Using the seed layer 601 as an electrode and a seed, plating films 611 and 631 are then formed on the seed layer 601 by plating. FIG. 12C illustrates an example in which the plating films 611 and 631 are formed by frame plating or pattern plating. In this example, a photoresist layer 101 of a photoresist material is formed after the formation of the seed layer 601. The photoresist layer 101 has an opening 101a for exposing the receiving section 131a and an opening 101b for exposing the receiving section 131b. Then, the plating film 611 is formed in the receiving section 131a and the opening 101a, and the plating film 631 is formed in the receiving section 131b and the opening 101b. The photoresist layer 101 is then removed.

The plating films 611 and 631 may be formed by first forming an initial plating film over the entire top surface of the seed layer 601 and then partially etching the initial plating film.

Figure 12D:
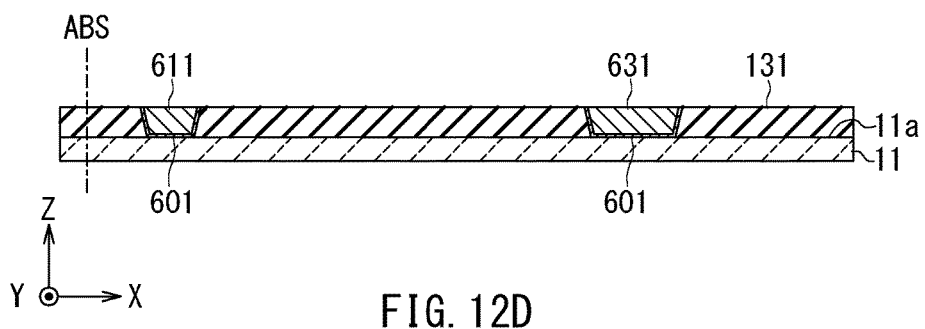

FIG. 12D shows the next step. In this step, the seed layer 601 and the plating films 611 and 631 are polished by, for example, chemical mechanical polishing (hereinafter referred to as CMP), until the insulating layer 131 becomes exposed.

Figure 12E:
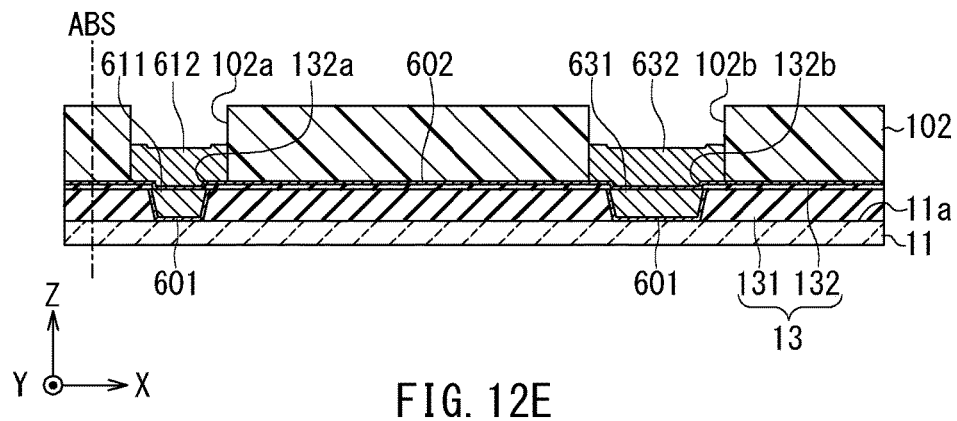

FIG. 12E shows the next step. In this step, an insulating layer 132, which constitutes the remainder of the insulating layer 13 (see FIGS. 7 and 8), is first formed on the top surface of the stack. The insulating layer 132 has an opening 132a for exposing the top surface of the plating film 611 and an opening 132b for exposing the top surface of the plating film 631. The insulating layer 132 may be formed by a lift-off process. Alternatively, the insulating layer 132 may be formed by first forming an insulating film without the openings 132a and 132b, and then forming the openings 132a and 132b in the insulating film by ion milling. Next, a seed layer 602 is formed over the entire top surface of the stack. A photoresist layer 102 of a photoresist material is then formed on the seed layer 602. The photoresist layer 102 has an opening 102a for exposing the top surface of the plating film 611, an opening 102b for exposing the top surface of the plating film 631, and a receiving section (not illustrated) for receiving the bottom shield layer 21 (see FIGS. 7 and 8). Next, a plating film is formed by frame plating or pattern plating using the photoresist layer 102. The plating film includes a plating film 612 lying in the openings 102a and 132a, a plating film 632 lying in the openings 102b and 132b, and the bottom shield layer 21 lying in the receiving section. In the case where frame plating is employed to form the plating film, the resulting plating film includes an unwanted portion. Next, the photoresist layer 102 is removed. Then, a portion of the seed layer 602 that is not covered with the plating film is removed. In the case where the plating film has been formed by frame plating, the aforementioned unwanted portion and a portion of the seed layer 602 lying under the unwanted portion are also removed.

Figure 12F:
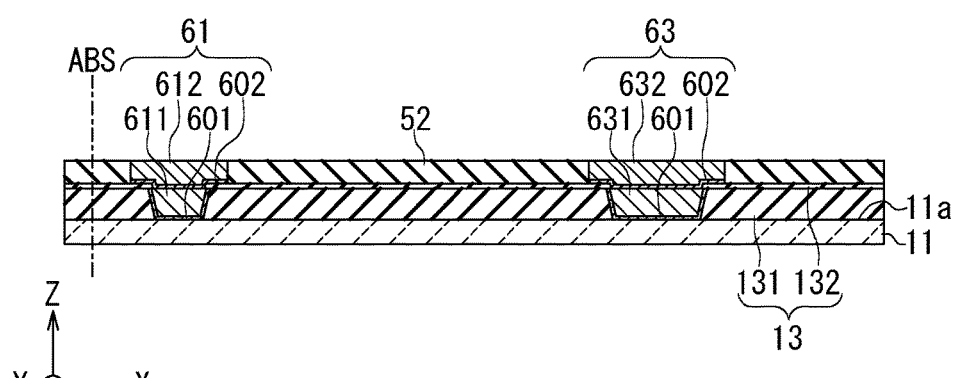

FIG. 12F shows the next step. In this step, first, the insulating layer 24 is formed over the entire top surface of the stack. Then, the bottom shield layer 21, the insulating layer 24 and the plating films 612 and 632 are polished by CMP, for example. This completes the lower main light-blocking section 61 and the lower subsidiary light-blocking section 63. The bottom main light-blocking section 61 is constituted by the plating film 612, a portion of the seed layer 602 lying under the plating film 612, the plating film 611, and a portion of the seed layer 601 lying under the plating film 611. The lower subsidiary light-blocking section 63 is constituted by the plating film 632, another portion of the seed layer 602 lying under the plating film 632, the plating film 631, and another portion of the seed layer 601 lying under the plating film 631.

The lower main light-blocking section 62 (see FIG. 3 to FIG. 4B) is formed in the same manner as described above in connection with the lower main light-blocking section 61 and the lower subsidiary light-blocking section 63.

In the step of fabricating the substructure, the parts from the MR element 22 to the coupling layer 27 and the insulating layer 31 (see FIGS. 7 and 8) are then formed in succession. Reference is now made to FIGS. 13A to 13E to describe steps to be performed after the formation of the insulating layer 31 up to the formation of the middle main light-blocking sections 71 to 73 and the middle subsidiary light-blocking sections 74 to 76. Here, descriptions will be made with the middle main light-blocking section 71 and the middle subsidiary light-blocking section 74 taken as an example. FIGS. 13A to 13E are cross-sectional views each showing part of a stack of layers fabricated in the process of fabrication of the substructure. FIGS. 13A to 13E each show a cross section that intersects the middle main light-blocking section 71 and the middle subsidiary light-blocking section 74 and is perpendicular to the medium facing surface 10a and the element-forming surface 11a. The symbol "ABS" in FIGS. 13A to 13E indicates the position at which the medium facing surface 10a is to be formed.

Figure 13A:
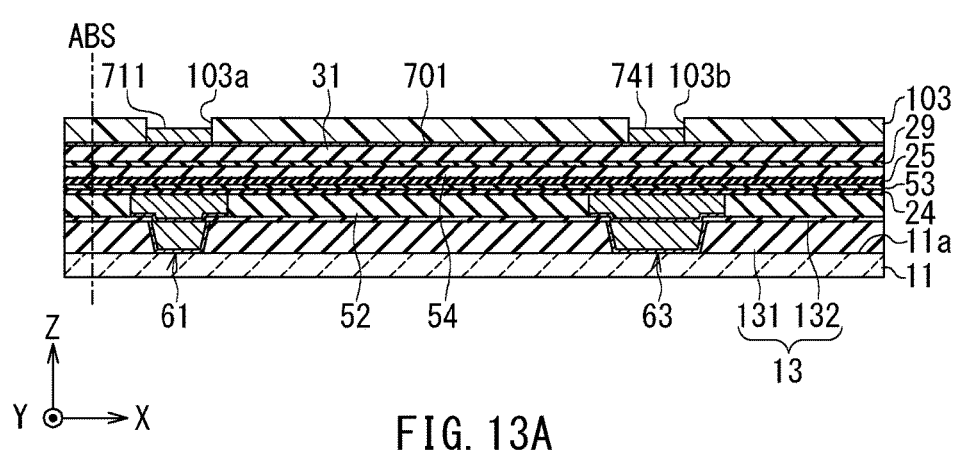
FIG. 13A to FIG. 13E are cross-sectional views showing the step of forming the three middle main light-blocking sections and the three middle subsidiary light-blocking sections in the step of fabricating the substructure of the embodiment of the invention.

FIG. 13A shows the step after the formation of the insulating layer 31. In this step, first, a seed layer 701 is formed over the entire top surface of the stack. Then, a photoresist layer 103 of a photoresist material is formed on the seed layer 701. The photoresist layer 103 has a receiving section 103a for receiving part of the middle main light-blocking section 71, a receiving section 103b for receiving part of the middle subsidiary light-blocking section 74, a first receiving section (not illustrated) for receiving the leading shield 32 (see FIGS. 7 and 8), a second receiving section (not illustrated) for receiving the second layer of the coupling section 28A (see FIG. 7), and a third receiving section (not illustrated) for receiving the second layer of the coupling section 28B (see FIG. 7). Next, a plating film is formed by frame plating or pattern plating using the photoresist layer 103. The plating film includes a plating film 711 lying in the receiving section 103a, a plating film 741 lying in the receiving section 103b, the leading shield 32 lying in the first receiving section, the second layer of the coupling section 28A lying in the second receiving section, and the second layer of the coupling section 28B lying in the third receiving section. In the case where frame plating is employed to form the plating film, the resulting plating film includes an unwanted portion. The photoresist layer 103 is then removed.

Figure 13B:
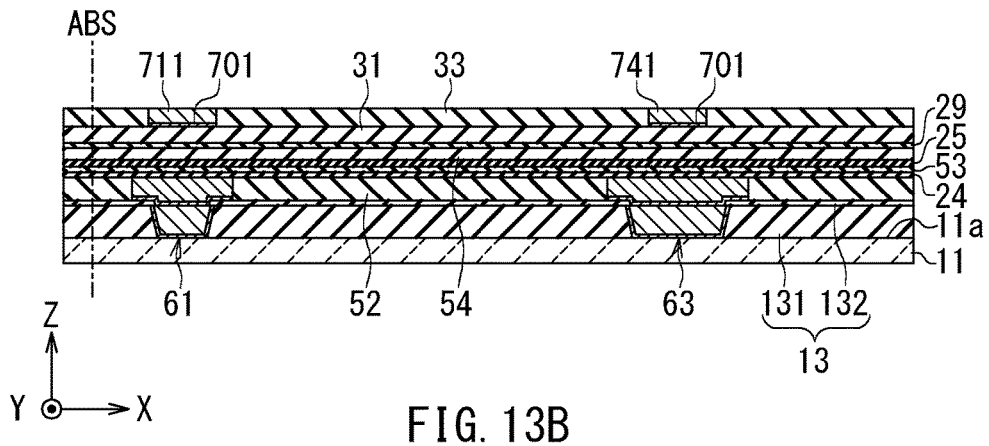

FIG. 13B shows the next step. In this step, first, a portion of the seed layer 701 that is not covered with the plating film is removed. In the case where the plating film has been formed by frame plating, the aforementioned unwanted portion and a portion of the seed layer 701 lying under the unwanted portion are also removed. Next, the insulating layer 33 is formed over the entire top surface of the stack. The insulating layer 33 is then polished by, for example, CMP, until the leading shield 32, the second layer of the coupling section 28A, the second layer of the coupling section 28B and the plating films 711 and 741 become exposed.

Figure 13C:
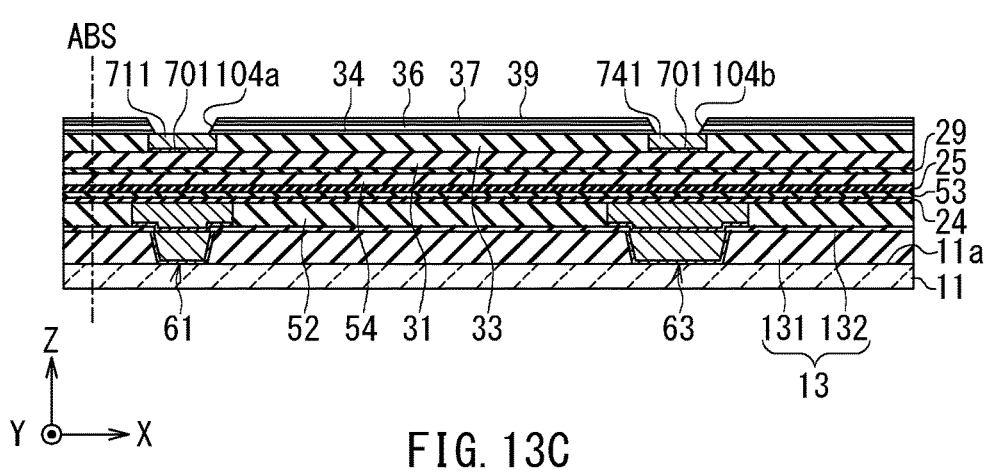

FIG. 13C shows the next step. In this step, first, the parts from the insulating layer 34 to the nonmagnetic metal film 42 (see FIGS. 7 to 9) are formed in succession. Then, an opening 104a for exposing the top surface of the plating film 711, an opening 104b for exposing the top surface of the plating film 741, a first opening (not illustrated) for exposing the top surface of the second layer of the coupling section 28A and a second opening (not illustrated) for exposing the top surface of the second layer of the coupling section 28B are formed through the insulating layers 34, 36, 37 and 39 by RIE or ion milling, for example.

Figure 13D:
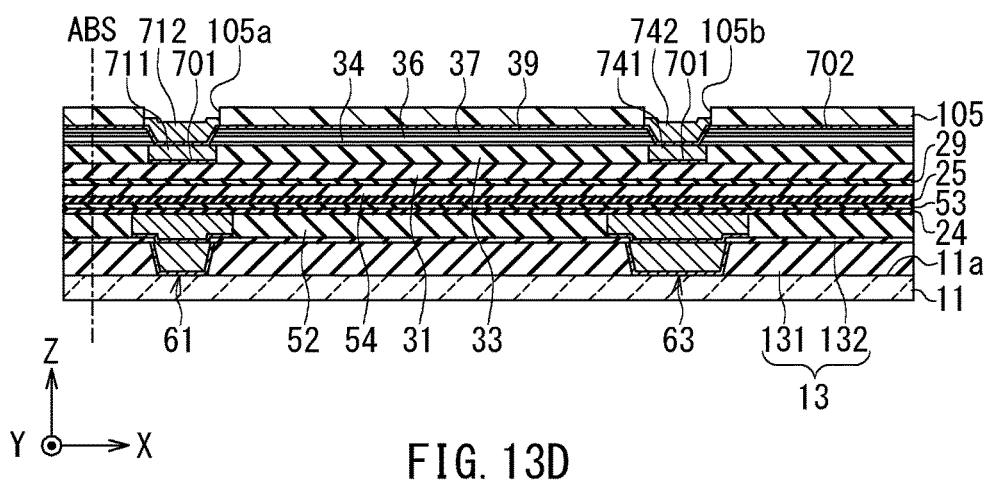

FIG. 13D shows the next step. In this step, first, a seed layer 702 is formed over the entire top surface of the stack. A photoresist layer 105 of a photoresist material is then formed on the seed layer 702. The photoresist layer 105 has an opening 105a for exposing the opening 104a, an opening 105b for exposing the opening 104b, a receiving section (not illustrated) for receiving the main pole 43 (see FIGS. 7 and 8), a third opening (not illustrated) for exposing the first opening formed through the insulating layers 34, 36, 37 and 39, and a fourth opening (not illustrated) for exposing the second opening formed through the insulating layers 34, 36, 37 and 39. Next, a plating film is formed by frame plating or pattern plating using the photoresist layer 105. The plating film includes a plating film 712 lying in the openings 104a and 105a, a plating film 742 lying in the openings 104b and 105b, the main pole 43 lying in the receiving section, the third layer of the coupling section 28A lying in the first and third openings, and the third layer of the coupling section 28B lying the second and fourth openings. In the case where frame plating is employed to form the plating film, the resulting plating film includes an unwanted portion. The photoresist layer 105 is then removed.

Figure 13E:
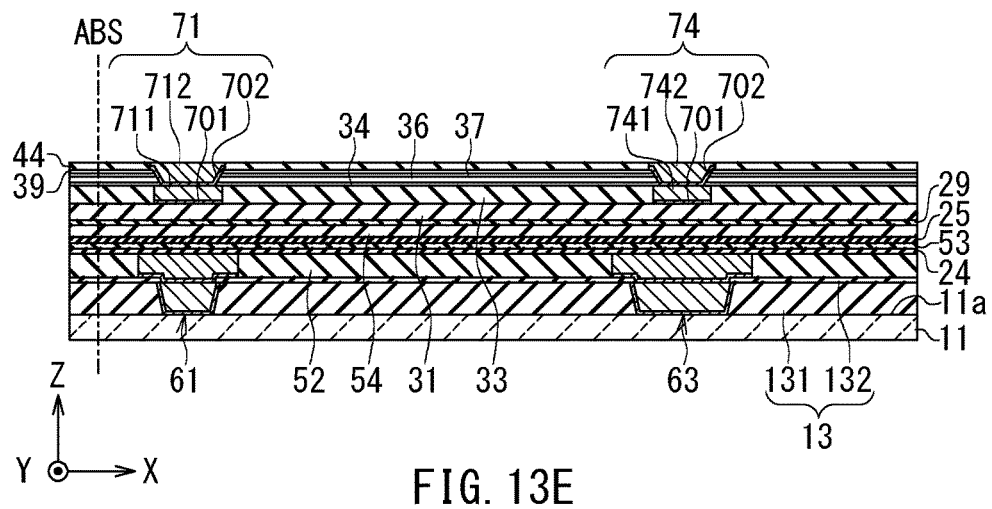

FIG. 13E shows the next step. In this step, first, a portion of the seed layer 702 that is not covered with the plating film is removed. In the case where the plating film has been formed by frame plating, the aforementioned unwanted portion and a portion of the seed layer 702 lying under the unwanted portion are also removed. Next, the insulating layer 44 is formed over the entire top surface of the stack. Then, the main pole 43, the insulating layer 44, the third layer of the coupling section 28A, the third layer of the coupling section 28B and the plating films 712 and 742 are polished by CMP, for example. This completes the middle main light-blocking section 71 and the middle subsidiary light-blocking section 74. The middle main light-blocking section 71 is constituted by the plating film 712, a portion of the seed layer 702 lying under the plating film 712, the plating film 711, and a portion of the seed layer 701 lying under the plating film 711. The middle subsidiary light-blocking section 74 is constituted by the plating film 742, another portion of the seed layer 702 lying under the plating film 742, the plating film 741, and another portion of the seed layer 701 lying under the plating film 741.

The middle main light-blocking sections 72 and 73 and the middle subsidiary light-blocking sections 75 and 76 (see FIGS. 3, 5A and 5B) are formed in the same manner as described above in connection with the middle main light-blocking section 71 and the middle subsidiary light-blocking section 74.

The step of fabricating the substructure then proceeds to the formation of the parts from the insulating layer 45 to the yoke layer 50 and the insulating layer 51 (see FIGS. 7 and 8) in succession. Steps to be performed after the formation of the insulating layer 51 up to the formation of the pad-shaped terminals 90 will now be described with reference to FIGS. 14A to 14E. FIGS. 14A to 14E are cross-sectional views each showing part of a stack of layers fabricated in the process of fabrication of the substructure. FIGS. 14A to 14E each show a cross section that intersects the upper main light-blocking section 81 and is perpendicular to the medium facing surface 10a and the element-forming surface 11a. The symbol "ABS" in FIGS. 14A to 14E indicates the position at which the medium facing surface 10a is to be formed.

Figure 14A:
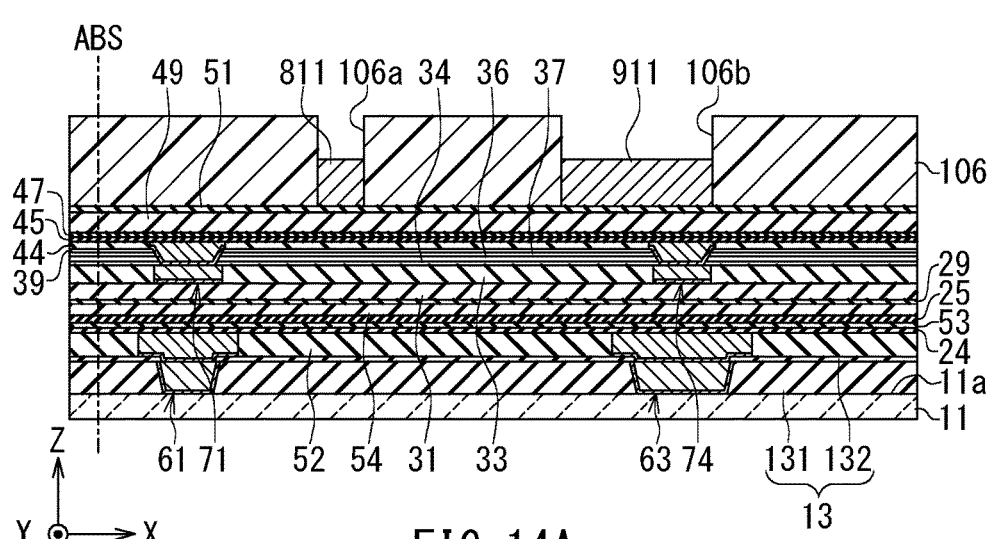
FIG. 14A to FIG. 14E are cross-sectional views showing the step of forming the upper main light-blocking section in the step of fabricating the substructure of the embodiment of the invention.

FIG. 14A shows the step following the formation of the insulating layer 51. In this step, first, a seed layer (not illustrated) is formed on the insulating layer 51. Then, a photoresist layer 106 of a photoresist material is formed on the seed layer. The photoresist layer 106 has a receiving section 106a for receiving a portion of the upper main light-blocking section 81 and receiving sections 106b for receiving respective portions of the columnar conductor sections 91. Then, a plating film is formed by pattern plating using the photoresist film 106. The plating film includes a plating film 811 lying in the receiving section 106a and plating films 911 lying in the receiving sections 106b. The photoresist layer 106 is then removed. Next, a portion of the non-illustrated seed layer that is not covered with the plating film is removed.

Figure 14B:
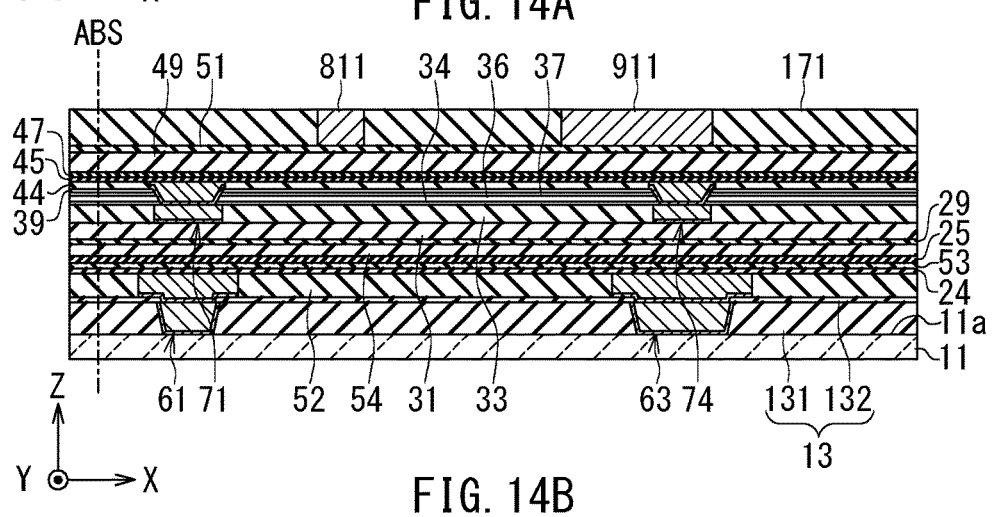

FIG. 14B shows the next step. In this step, first, an insulating layer 171 constituting part of the protective layer 17 is formed over the entire top surface of the stack. The insulating layer 171 is then polished by, for example, CMP, until the plating films 811 and 911 become exposed.

Figure 14C:
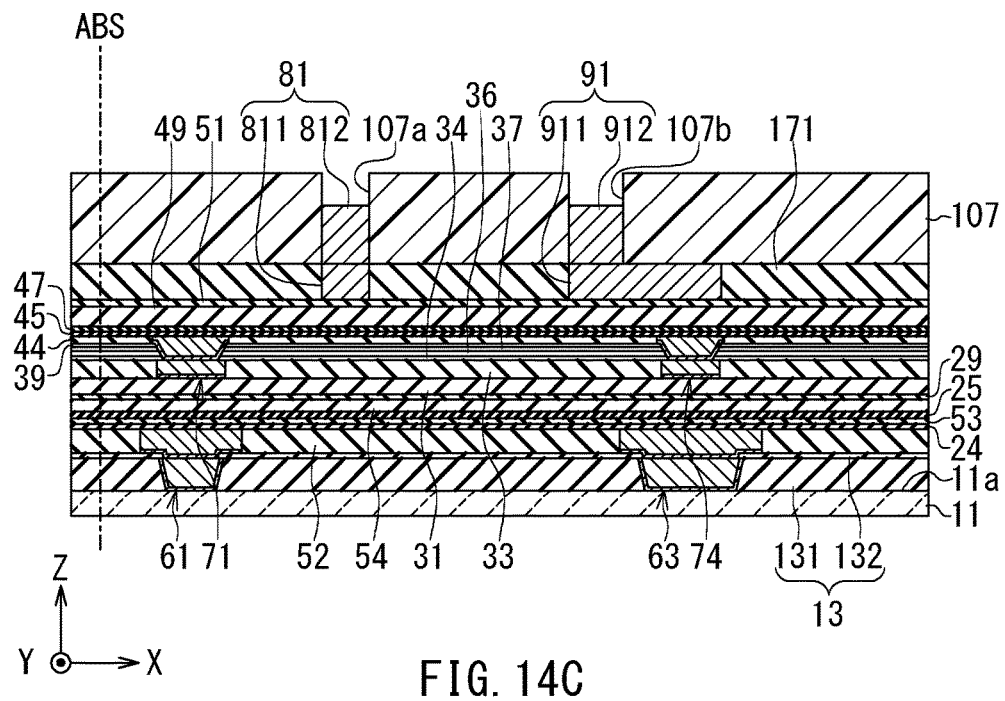

FIG. 14C shows the next step. In this step, first, a seed layer (not illustrated) is formed over the entire top surface of the stack. Then, a photoresist layer 107 of a photoresist material is formed on the seed layer. The photoresist layer 107 has a receiving section 107a for receiving a portion of the upper main light-blocking section 81 and receiving sections 107b for receiving respective portions of the columnar conductor sections 91. Then, a plating film is formed by pattern plating using the photoresist film 107. The plating film includes a plating film 812 lying in the receiving section 107a and plating films 912 lying in the receiving sections 107b. The photoresist layer 107 is then removed. Next, a portion of the non-illustrated seed layer that is not covered with the plating film is removed. This completes the upper main light-blocking section 81 and the columnar conductor sections 91. The upper main light-blocking section 81 is constituted by the plating film 812, a portion of the non-illustrated seed layer lying under the plating film 812, the plating film 811, and a portion of the non-illustrated seed layer lying under the plating film 811. The columnar conductor sections 91 are constituted by the plating films 912, portions of the non-illustrated seed layer lying under the plating films 912, the plating films 911, and portions of the non-illustrated seed layer lying under the plating films 911.

Figure 14D:
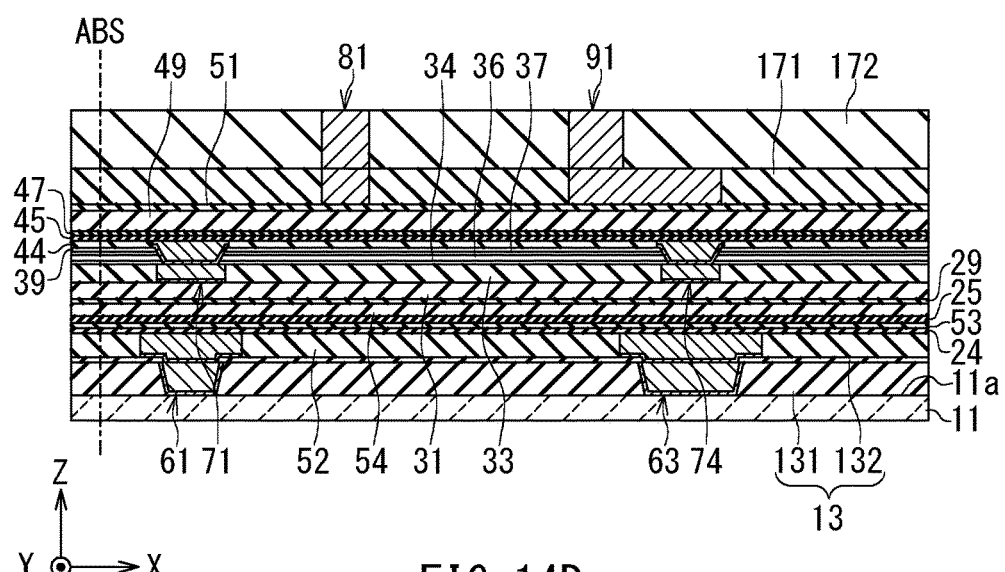

FIG. 14D shows the next step. In this step, first, an insulating layer 172 constituting another part of the protective layer 17 is formed over the entire top surface of the stack. The insulating layer 172 is then polished by, for example, CMP, until the upper main light-blocking section 81 and the columnar conductor sections 91 become exposed.

Figure 14E:
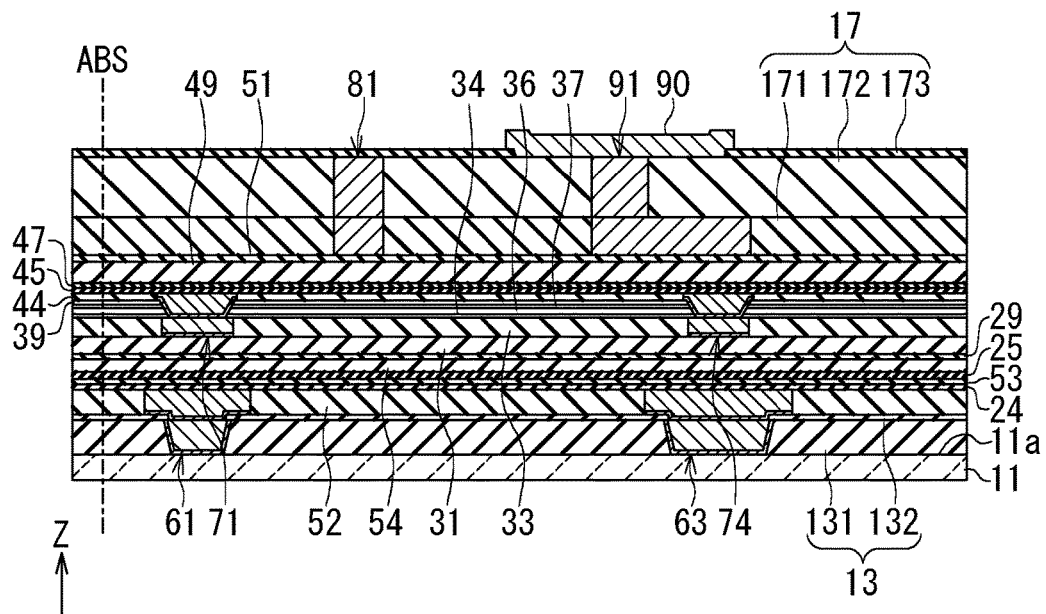

FIG. 14E shows the next step. In this step, first, an insulating layer 173 constituting the remainder of the protective layer 17 is formed over the entire top surface of the stack. The insulating layer 173 is then selectively etched to form therein openings 173b for exposing the top surfaces of the columnar conductor sections 91. The pad-shaped terminals 90 are then formed on the columnar conductor sections 91.

Figure 15:
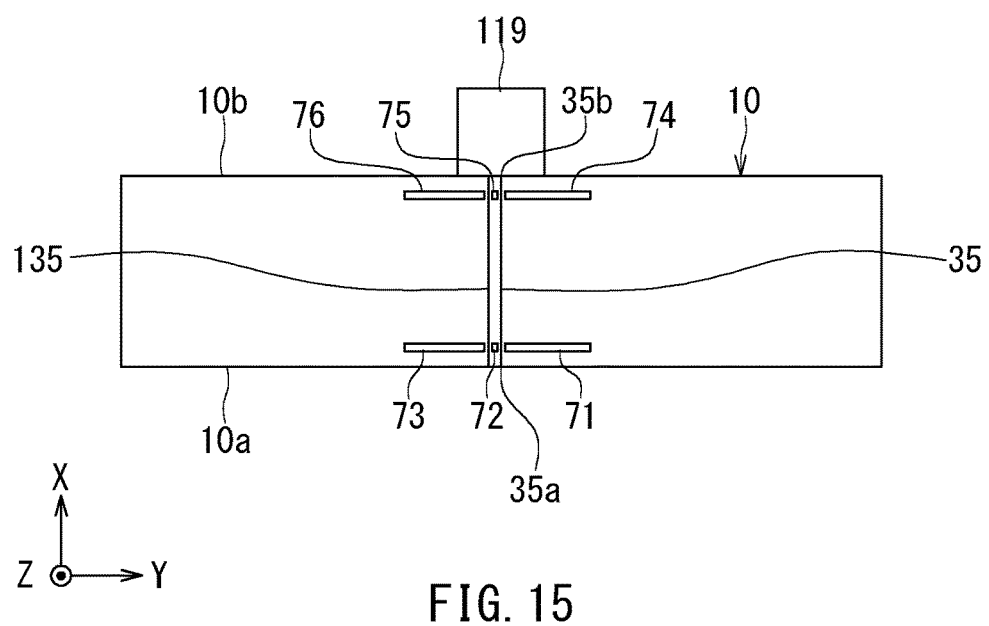
FIG. 15 is a plan view showing the head body in the step of forming a protective film of the embodiment of the invention.

The step of forming the protective film 18 will now be described in detail. The step of forming the protective film 18 is performed on individual head bodies 10 after the substructure is cut to separate the plurality of pre-head-body portions from each other into the individual head bodies 10. In the step of forming the protective film 18, exposure laser light is used as the exposure light to be described later, and a laser diode 119 is used as an emission source of the exposure laser light. As shown in FIG. 15, the laser diode 119 is in alignment with the head body 10 so that the exposure laser light emitted from the laser diode 119 will enter the entrance end face 35b of the waveguide 35. The laser diode 119 emits laser light having a wavelength different from that of the excitation laser light emitted by the laser diode 19. The wavelength of the laser light emitted by the laser diode 119 is 418 nm, for example.

The step of forming the protective film 18 includes the step of forming a mask by patterning a photoresist film, and the step of forming the first portion 18A and the second portion 18B using the mask. The step of forming the mask includes the step of causing the exposure laser light to enter the entrance end face 35b of the waveguide 35 and exposing a portion of the photoresist film covering the second region R2 of the medium facing surface 10a to the exposure laser light emerging from the exit end face 35a.

Now, the steps of forming first to fifth examples of the protective film 18 will be described. First, reference is made to FIGS. 16A to 16G to describe the step of forming the first example of the protective film 18. The first example of the protective film 18 is the protective film 18 shown in FIG. 9. FIGS. 16A to 16G are cross-sectional views of part of the head body 10 in the step of forming the first example of the protective film 18. FIGS. 16A to 16G each show a cross section that intersects the exit end face 35a and the near-field light generating surface 38a and is perpendicular to the medium facing surface 10a and the element-forming surface 11a (see FIGS. 7 and 8).

Figure 16A:
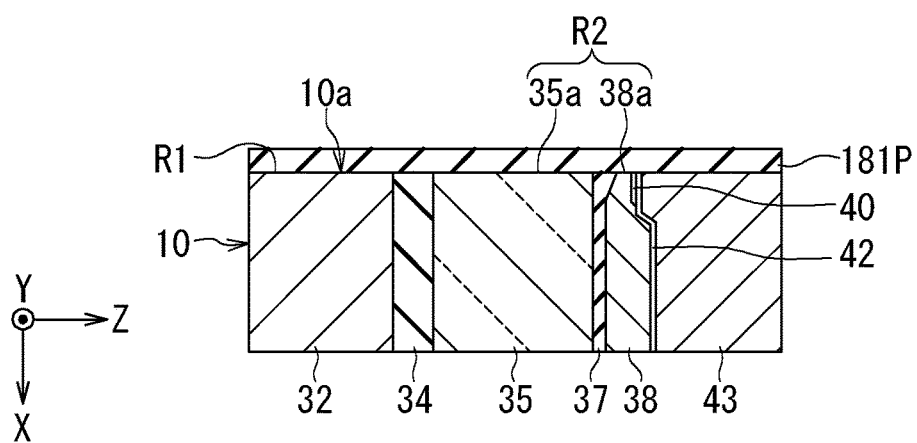
FIG. 16A to FIG. 16G are cross-sectional views showing the step of forming a first example of the protective film of the embodiment of the invention.

For the first example, as shown in FIG. 16A, a first initial protective film 181P of the first material is initially formed on the medium facing surface 10a. The first initial protective film 181P covers the first and second regions R1 and R2 of the medium facing surface 10a.

Figure 16B:
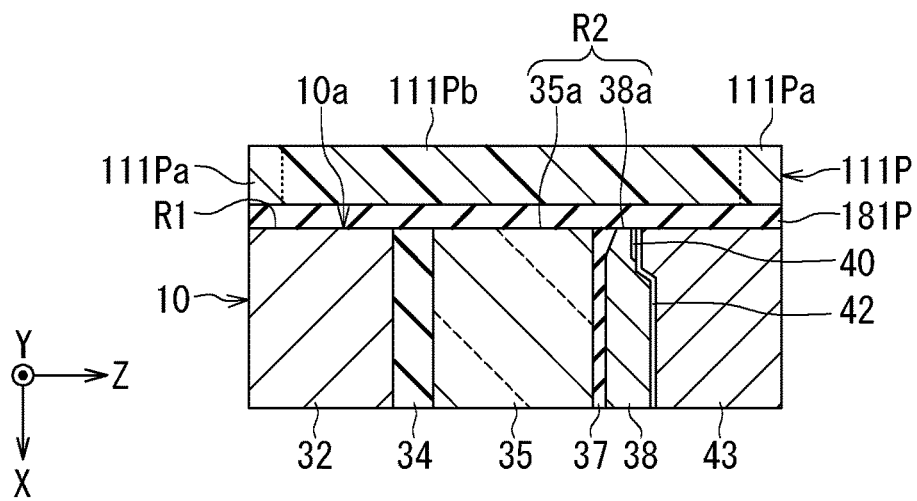

FIG. 16B shows the next step. In this step, a photoresist film 111P of a positive photoresist is formed on the first initial protective film 181P. The photoresist film 111P includes a first portion 111Pa covering the first region R1 and a second portion 111Pb covering the second region R2. In FIG. 16B the boundary between the first portion 111Pa and the second portion 111Pb is shown by a dotted line.

Figure 16C:
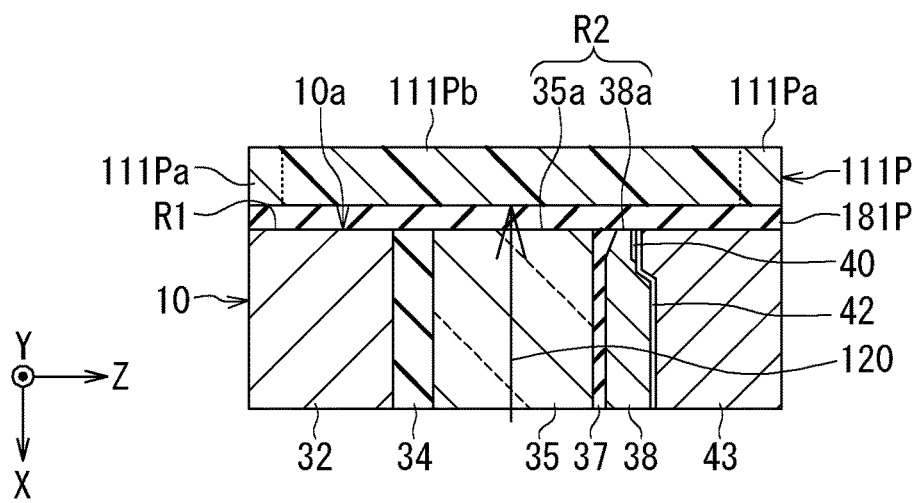

For the first example, next performed is the step of forming a mask 111 by patterning the photoresist film 111P. The step of forming the mask 111 will now be described with reference to FIGS. 16C and 16D. In the step of forming the mask 111, first, the exposure laser light emitted from the laser diode 119 is caused to enter the entrance end face 35b of the waveguide 35 (see FIG. 15). As shown in FIG. 16C, the exposure laser light 120 having entered the entrance end face 35b propagates through the waveguide 35 and exits from the exit end face 35b of the waveguide 35. The second portion 111Pb of the photoresist film 111P covering the second region R2 is exposed to the laser light 120. Having undergone the exposure, the second portion 111Pb becomes soluble in a developing solution.

Figure 16D:
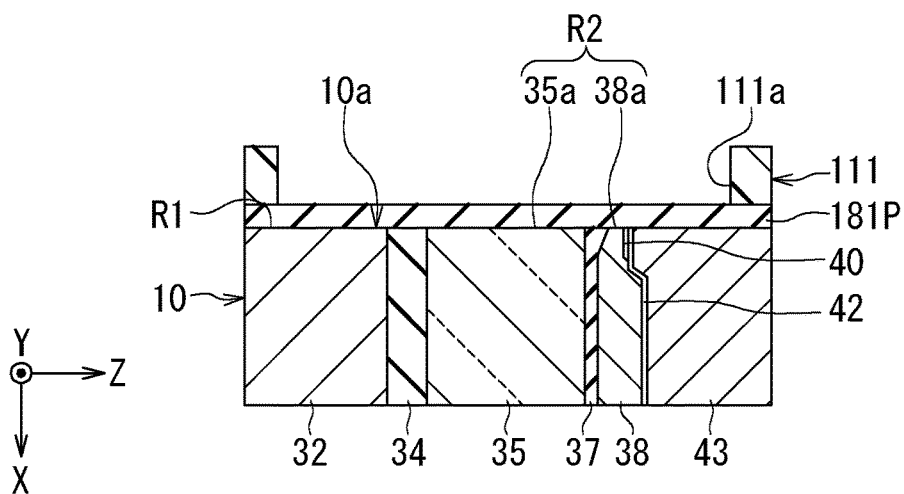

In the step of forming the mask 111, the second portion 111Pb is then removed using the developing solution, as shown in FIG. 16D. This makes the photoresist film 111P into the mask 111. The mask 111 covers the first region R1 and does not cover the second region R2. The mask 111 has an opening 111a for exposing a portion of the first initial protective film 181P covering the second region R2.

Figure 16E:
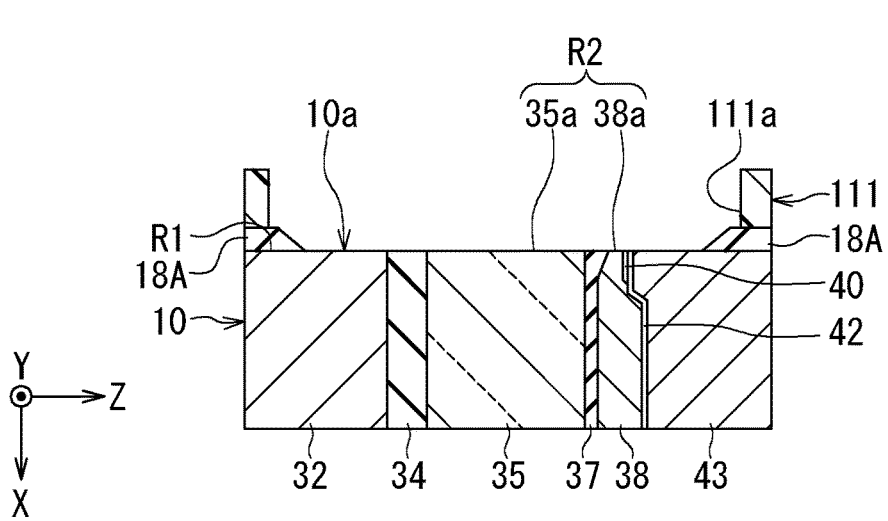

FIG. 16E shows the next step. In this step, the portion of the first initial protective film 181P exposed from the opening 111a of the mask 111 is etched using the mask 111. The remaining portion of the first initial protective film 181P after the etching makes the first portion 18A.

Figure 16F:
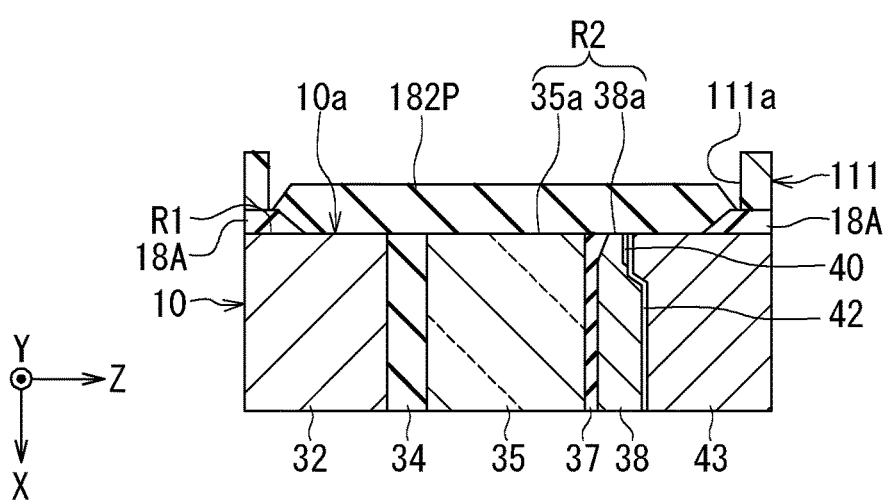
Figure 16G:
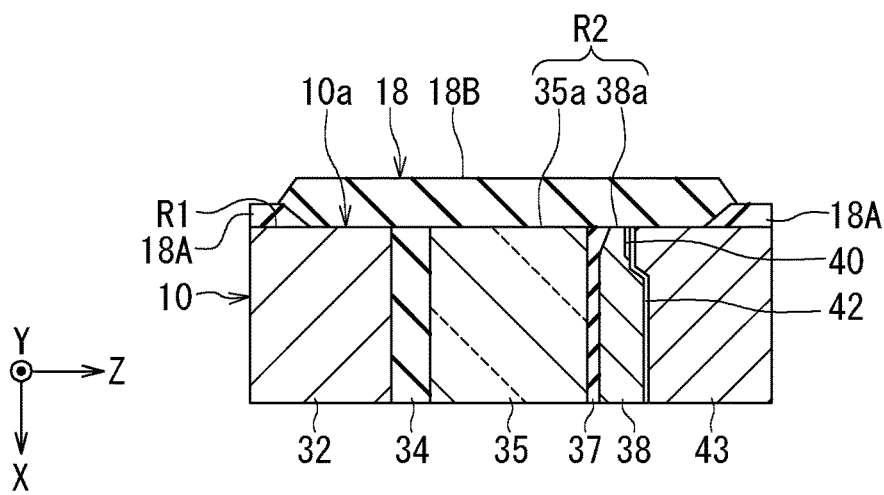

FIG. 16F shows the next step. In this step, a second initial protective film 182P of the second material is formed to cover the second region R2. The second initial protective film 182P is formed such that a portion thereof lying on the second region R2 is thicker than the first portion 18A. Although not illustrated, the material for forming the second initial protective film 182P deposits also on the surface of the mask 111. The mask 111 is then removed as shown in FIG. 16G. As a result, the remaining second initial protective film 182P makes the second portion 18B, and the protective film 18 is thereby completed.

Figure 17:
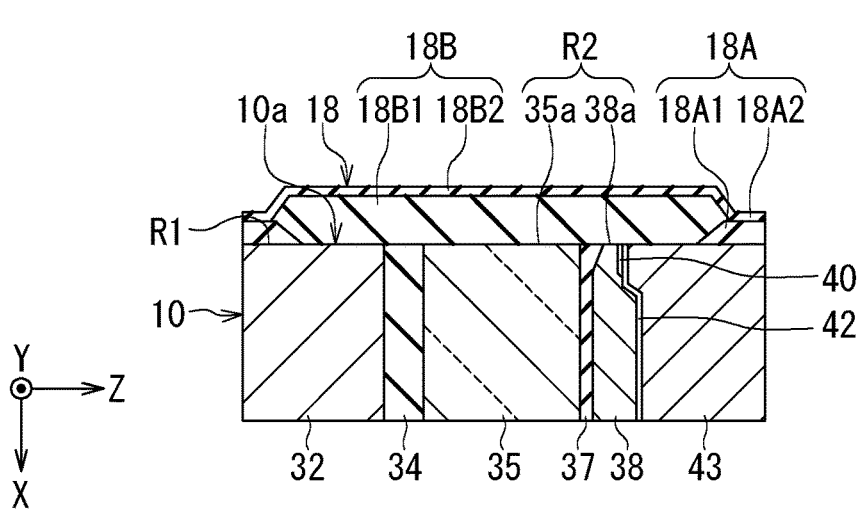
FIG. 17 is a cross-sectional view showing the step of forming a second example of the protective film of the embodiment of the invention.

The step of forming the second example of the protective film 18 will now be described with reference to FIG. 17. FIG. 17 is a cross-sectional view of part of the head body 10 in the step of forming the second example of the protective film 18. FIG. 17 shows a cross section that intersects the exit end face 35a and the near-field light generating surface 38a and is perpendicular to the medium facing surface 10a and the element-forming surface 11a (see FIGS. 7 and 8).

In the second example of the protective film 18, the first portion 18A includes a first layer 18A1 and a second layer 18A2. The first layer 18A1 and the second layer 18A2 are stacked in this order on the first region R1 of the medium facing surface 10a. The second portion 18B of the second example of the protective film 18 includes a first layer 18B1 and a second layer 18B2. The first layer 18B1 and the second layer 18B2 are stacked in this order on the second region R2 of the medium facing surface 10a. The first layer 18A1 and the second layers 18A2 and 18B2 are formed of the first material. The first layer 18B1 is formed of the second material. The second layer 18A2 and the second layer 18B2 may be continuous into a single layer.

The step of forming the second example of the protective film 18 will be described in detail below. The first layer 18A of the first portion 18A and the first layer 18B1 of the second portion 18B are formed in the same manner as the first portion 18A and the second portion 18B of the first example. The description of the series of steps shown in FIG. 16A through FIG. 16G serves as the description of the method of forming the first layer 18A1 and the first layer 18B1 if the first portion 18A and the second portion 18B in the description are replaced with the first layer 18A1 and the first layer 18B1, respectively.

For the second example, a single continuous layer of the first material for forming the second layer 18A2 of the first portion 18A and the second layer 18B2 of the second portion 18B is formed after the formation of the first layers 18A1 and 18B1. Of the single continuous layer, a portion lying on the first layer 18A1 serves as the second layer 18A2, and a portion lying on the first layer 18B1 serves as the second layer 18B2. The protective film 18 is thereby completed.

Figure 18A:
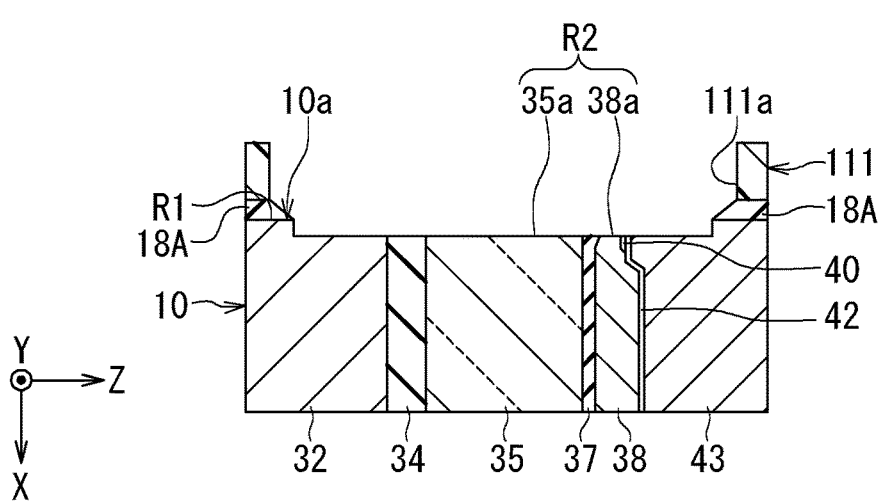
FIG. 18A to FIG. 18C are cross-sectional views showing the step of forming a third example of the protective film of the embodiment of the invention.
Figure 18B:
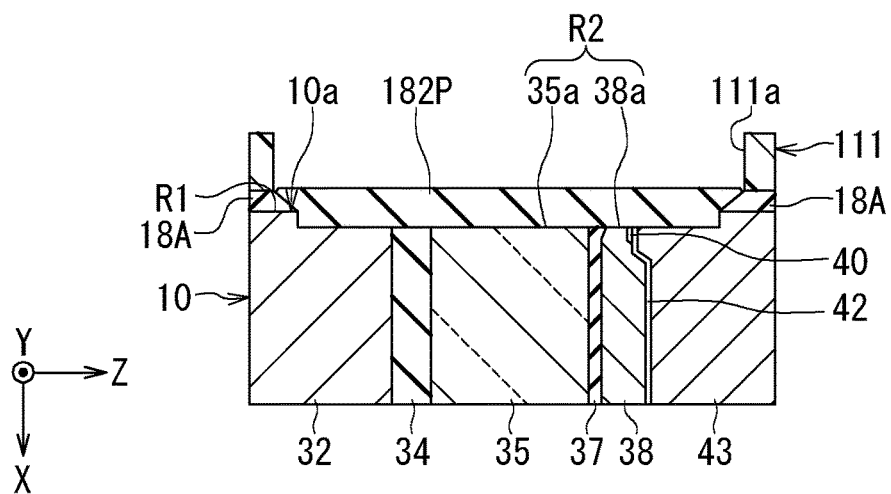
Figure 18C:
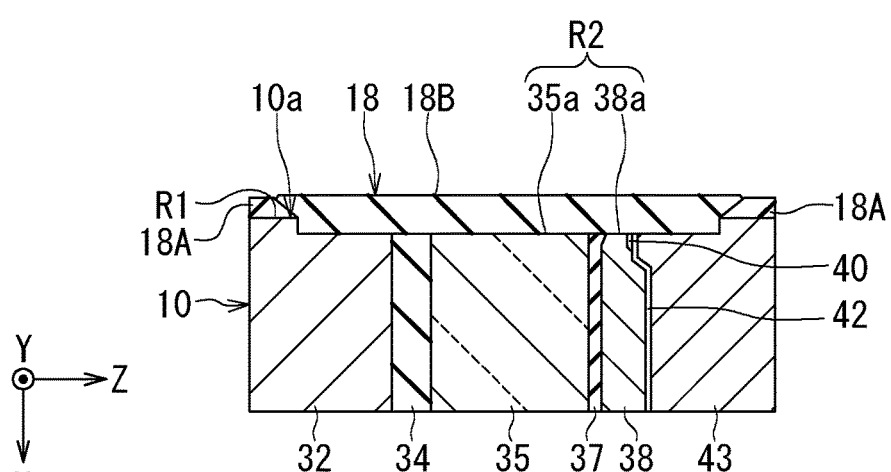

The step of forming the third example of the protective film 18 will now be described with reference to FIGS. 18A to 18C. FIGS. 18A to 18C are cross-sectional views of part of the head body 10 in the step of forming the third example of the protective film 18. FIGS. 18A to 18C each show a cross section that intersects the exit end face 35a and the near-field light generating surface 38a and is perpendicular to the medium facing surface 10a and the element-forming surface 11a (see FIGS. 7 and 8).

The third example of the protective film 18 has basically the same configuration as the first example of the protective film 18. For the third example, however, part of the second portion 18B of the protective film 18 is formed to be embedded in the head body 10. The step of forming the third example of the protective film 18 will be described in detail below. For the third example, the same steps as those for the first example are performed up to the step of FIG. 16D. FIG. 18A shows the next step. In this step, first, the portion of the first initial protective film 181P exposed from the opening 111a of the mask 111 is etched using the mask 111 (see FIG. 16D). The remaining portion of the first initial protective film 181P after the etching makes the first portion 18A. Subsequently, a portion of the head body 10 exposed from the opening 111a of the mask 111 is etched using the mask 111. This forms a recess in the medium facing surface 10a. The second region R2 lies at the bottom of the recess.

FIG. 18B shows the next step. In this step, a second initial protective film 182P of the second material is formed to cover the second region R2. The second initial protective film 182P is formed to fill the recess formed in the medium facing surface 10a and such that a portion thereof lying on the second region R2 is thicker than the first portion 18A. Although not illustrated, the material for forming the second initial protective film 182P deposits also on the surface of the mask 111. The mask 111 is then removed as shown in FIG. 18C. As a result, the remaining second initial protective film 182P makes the second portion 18B, and the protective film 18 is thereby completed.

The step of forming the fourth example of the protective film 18 will now be described with reference to FIGS. 19A to 19G. FIGS. 19A to 19G are cross-sectional views of part of the head body 10 in the step of forming the fourth example of the protective film 18. FIGS. 19A to 19G each show a cross section that intersects the exit end face 35a and the near-field light generating surface 38a and is perpendicular to the medium facing surface 10a and the element-forming surface 11a (see FIGS. 7 and 8).

In the fourth example of the protective film 18, the second portion 18B includes a first layer 18B1 and a second layer 18B2. The first layer 18B1 and the second layer 18B2 are stacked in this order on the second region R2 of the medium facing surface 10a. The first portion 18A and the second layer 18B2 are formed of the first material. The first layer 18B1 is formed of the second material. The first portion 18A and the second layer 18B2 may be continuous into a single layer.

Figure 19A:
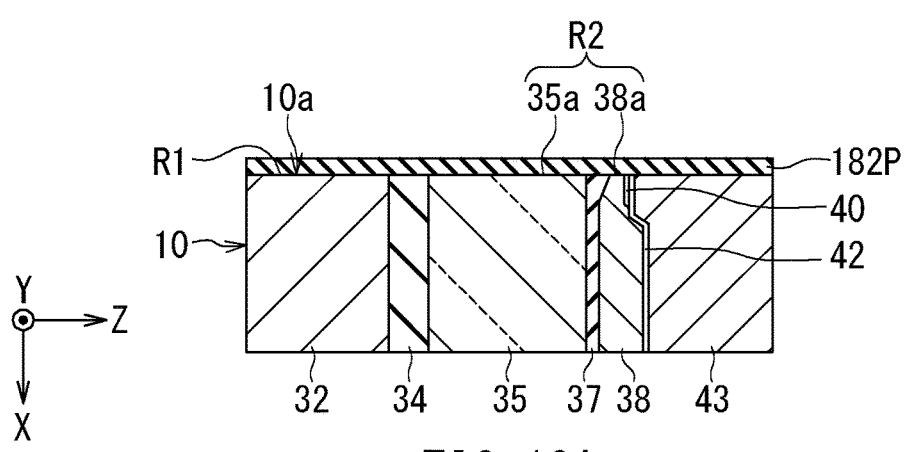
FIG. 19A to FIG. 19G are cross-sectional views showing the step of forming a fourth example of the protective film of the embodiment of the invention.

The step of forming the fourth example of the protective film 18 will be described in detail below. For the fourth example, first, a second initial protective film 182P of the second material is formed on the medium facing surface 10a, as shown in FIG. 19A. The second initial protective film 182P covers the first and second regions R1 and R2 of the medium facing surface 10a.

Figure 19B:
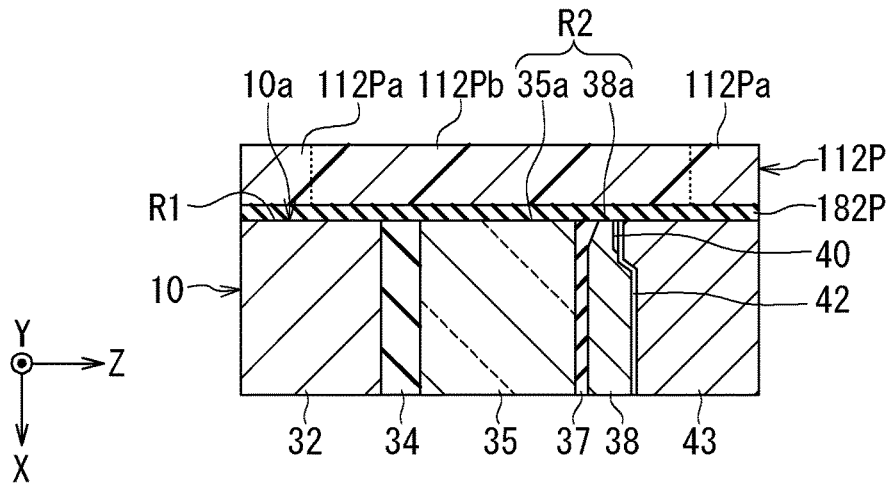

FIG. 19B shows the next step. In this step, a photoresist film 112P of a negative photoresist is formed on the second initial protective film 182P. The photoresist film 112P includes a first portion 112Pa covering the first region R1 and a second portion 112Pb covering the second region R2. In FIG. 19B the boundary between the first portion 112Pa and the second portion 112Pb is shown by a dotted line.

Figure 19C:
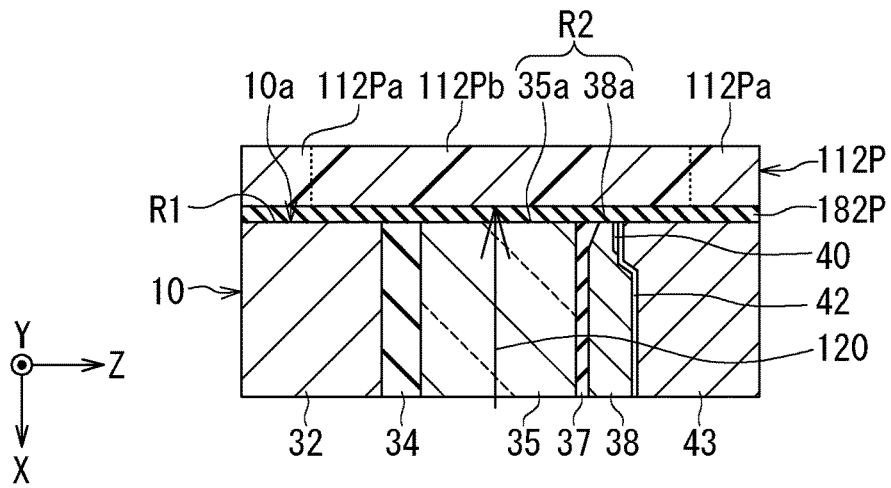

For the fourth example, next performed is the step of forming a mask 112 by patterning the photoresist film 112P. The step of forming the mask 112 will now be described with reference to FIGS. 19C and 19D. In the step of forming the mask 112, first, the exposure laser light emitted from the laser diode 119 (see FIG. 15) is caused to enter the entrance end face 35b of the waveguide 35. As shown in FIG. 19C, the exposure laser light 120 having entered the entrance end face 35b propagates through the waveguide 35 and exits from the exit end face 35b of the waveguide 35. The second portion 112Pb of the photoresist film 112P covering the second region R2 is exposed to the laser light 120. Having undergone the exposure, the second portion 112Pb becomes insoluble in a developing solution.

Figure 19D:
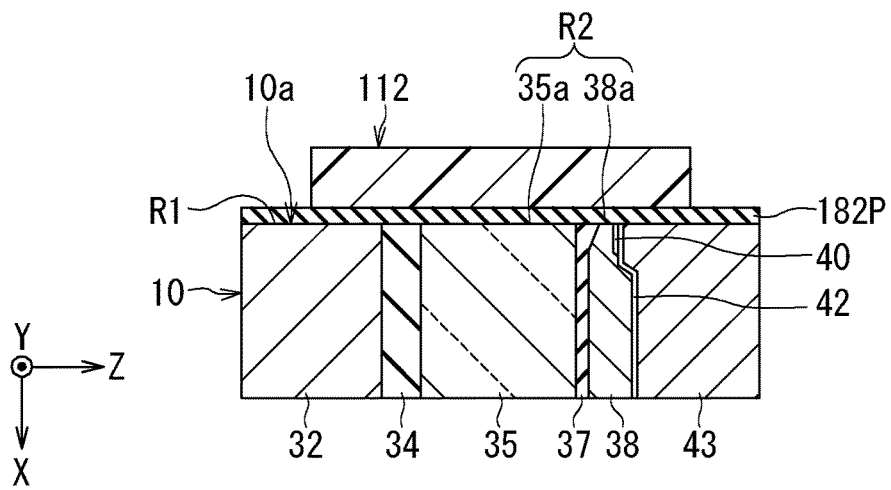

In the step of forming the mask 112, the first portion 112Pa is then removed using the developing solution, as shown in FIG. 19D. This makes the photoresist film 112P into the mask 112. The mask 112 covers the second region R2 and does not cover the first region R1.

Figure 19E:
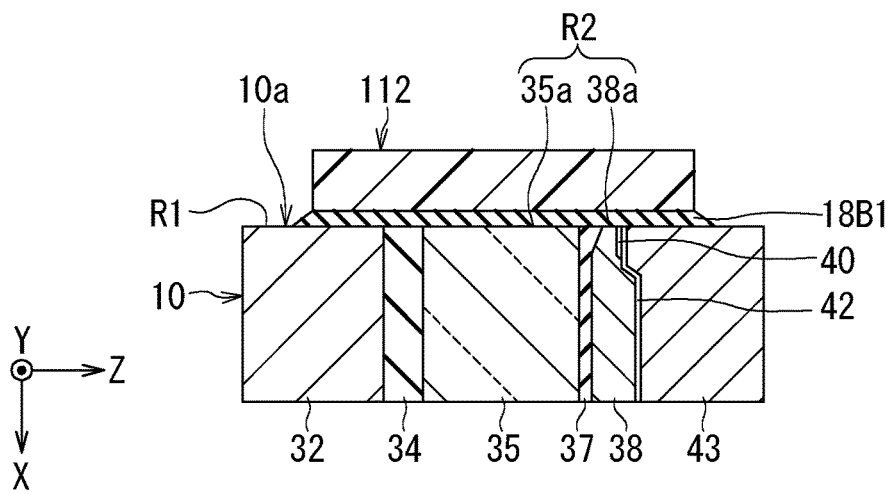
Figure 19F:
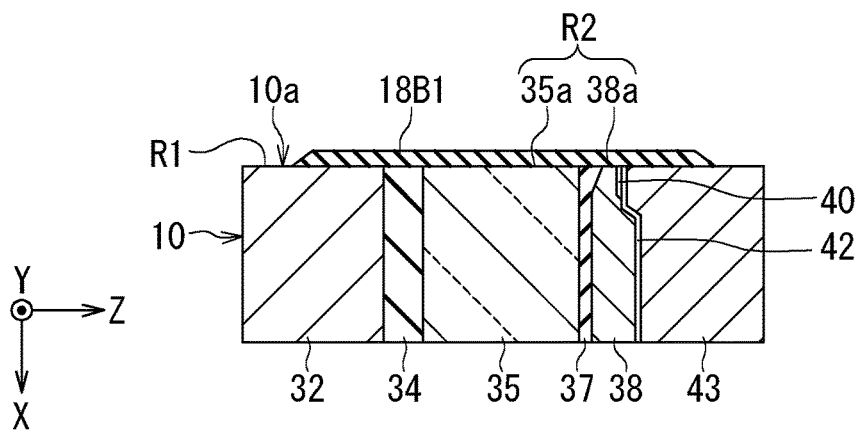

FIG. 19E shows the next step. In this step, a portion of the second initial protective film 182P not covered with the mask 112 is etched using the mask 112. The remaining portion of the second initial protective film 182P after the etching makes the first layer 18B1 of the second portion 18B. The mask 112 is then removed as shown in FIG. 19F.

Figure 19G:
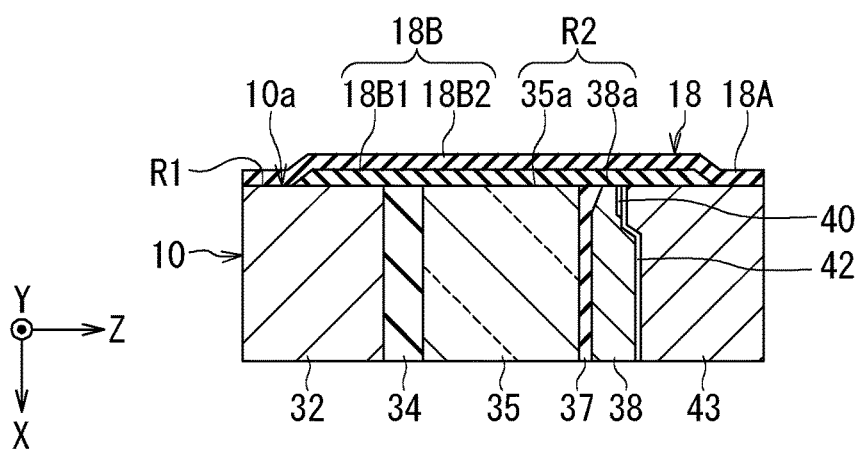

FIG. 19G shows the next step. In this step, a single continuous layer of the first material for forming the first portion 18A and the second layer 18B2 of the second portion 18B is formed to cover the first layer 18B1. Of the single continuous layer, a portion lying on the first region R1 serves as the first portion 18A, and a portion lying on the first layer 18B1 serves as the second layer 18B2. The protective film 18 is thereby completed.

Figure 20A:
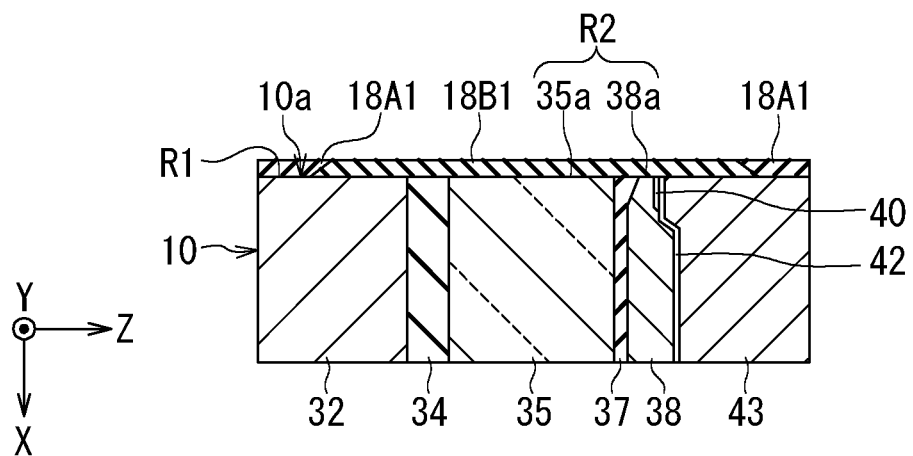
FIG. 20A and FIG. 20B are cross-sectional views showing the step of forming a fifth example of the protective film of the embodiment of the invention.
Figure 20B:
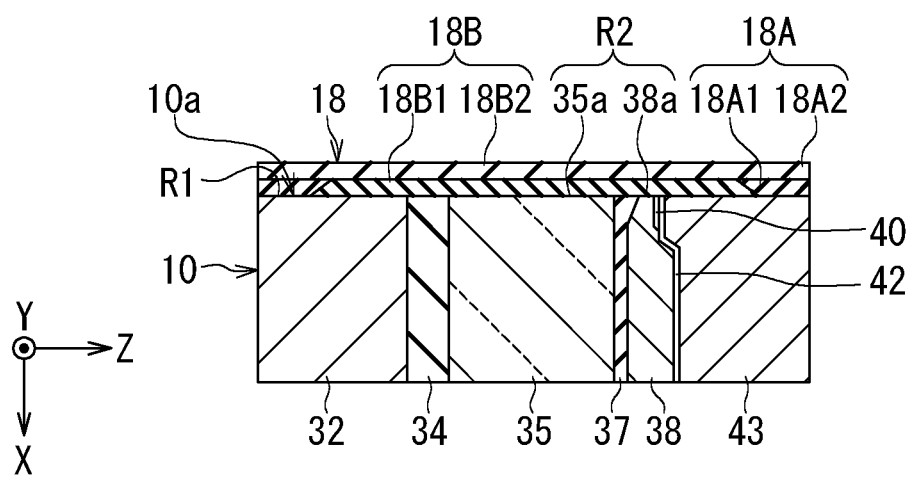

The step of forming the fifth example of the protective film 18 will now be described with reference to FIGS. 20A and 20B. FIGS. 20A and 20B are cross-sectional views of part of the head body 10 in the step of forming the fifth example of the protective film 18. FIGS. 20A and 20B each show a cross section that intersects the exit end face 35a and the near-field light generating surface 38a and is perpendicular to the medium facing surface 10a and the element-forming surface 11a (see FIGS. 7 and 8).

The fifth example of the protective film 18 has the same configuration as the second example of the protective film 18. The step of forming the fifth example of the protective film 18 will be described in detail below. For the fifth example, the same steps as those for the fourth example are performed up to the step of FIG. 19E. FIG. 20A shows the next step. In this step, a first initial protective film of the first material is formed in the presence of the mask 112 (see FIG. 19E). The material for forming the first initial protective film deposits also on the surface of the mask 112. The mask 112 is then removed. As a result, the remaining first initial protective film makes the first layer 18A1 of the first portion 18A.

FIG. 20B shows the next step. In this step, a single continuous layer of the first material for forming the second layer 18A2 of the first portion 18A and the second layer 18B2 of the second portion 18B is formed. Of the single continuous layer, a portion lying on the first layer 18A1 serves as the second layer 18A2, and a portion lying on the first layer 18B1 serves as the second layer 18B2. The protective film 18 is thereby completed.

As has been described, in the thermally-assisted magnetic recording head 1 according to the present embodiment, the protective film 18 includes the first portion 18A and the second portion 18B. The first portion 18A and the second portion 18B are different from each other in at least one of thickness and material configuration. By virtue of this, the present embodiment enables preventing damage to a portion of the protective film 18 near the plasmon generator 38 due to heat generated by the plasmon generator 38 or due to a deformation of the plasmon generator 38 caused by the heat.

In the manufacturing method for the thermally-assisted magnetic recording head 1 according to the present embodiment, a mask is formed by patterning a photoresist film and the mask is used in forming the first portion 18A and the second portion 18B of the protective film 18. In the step of forming the mask, the exposure laser light is caused to enter the entrance end face 35b of the waveguide 35, and the portion of the photoresist film covering the second region R2 of the medium facing surface 10a is exposed to the exposure laser light emerging from the exit end face 35a of the waveguide 35. Such a method enables easy and accurate formation of the mask for use to form the first portion 18A and the second portion 18B.

If, in the step of forming the mask, part of the exposure laser light passes through a part of the head body 10 other than the waveguide 35 and reaches the photoresist film, then the photoresist film will undergo unwanted exposure at a portion thereof covering the first region R1. In such a case, the mask will become defective, and as a result, the protective film 18 may also become defective.

In the present embodiment, the head body 10 includes at least one main light-blocking section. The at least one main light-blocking section is lower in transmittance for light of any wavelength within the range of 10 to 900 nm than the waveguide and the insulating section, and is located to intersect at least one imaginary straight line connecting the entrance end face 35b and the first region R1. The at least one main light-blocking section has the function of blocking at least part of the laser light that is emitted from the laser diode 119 and passes through a part of the head body 10 other than the waveguide 35 toward the photoresist film from reaching the photoresist film. By virtue of this, the present embodiment provides a thermally-assisted magnetic recording head with the protective film 18 of high reliability.

In order for the at least one main light-blocking section to effectively perform the above-described function, the distance from the medium facing surface 10a to the at least one main light-blocking section is preferably smaller than or equal to one-half the distance from the medium facing surface 10a to the entrance end face 35b.

The head body 10 may further include at least one subsidiary light-blocking section. The at least one subsidiary light-blocking section can be provided with the same function as that of the at least one main light-blocking section described above. The at least one subsidiary light-blocking section can further be provided with the function of blocking at least part of the laser light that is emitted from the laser diode 119 and reflected off the interface between two layers inside the head body 10 to travel toward the photoresist film from reaching the photoresist film.

Now, a description will be given of the results of first to third experiments which were conducted to ascertain the effect of the present embodiment. For the first to third experiments, 20 each of first to thirteenth samples and comparative samples were prepared. All these samples are head body samples. None of these samples includes the dummy waveguide 135.

In the first to third experiments, three different regions of the medium facing surface 10a, i.e., a lower region R11, a middle region R12 and an upper region R13 shown in FIG. 21, were defined as described below.

All the regions R11, R12 and R13 are rectangular regions each defined by a first edge which is an end in the −Z direction, a second edge which is an end in the Z direction, a third edge which is an end in the −Y direction, and a fourth edge which is an end in the Y direction. The first and second edges are parallel to the Y direction. The third and fourth edges are parallel to the Z direction.

The first edge of the lower region R11 lies at the level of the element-forming surface 11a in the medium facing surface 10a. The second edge of the lower region R11 and the first edge of the middle region R12 include the top end of the top shield layer 23 in the medium facing surface 10a. The second edge of the middle region R12 and the first edge of the upper region R13 include the boundary between the main pole 43 and the coupling layer 48 in the medium facing surface 10a. The second edge of the upper region R13 lies at the level of the top end of the medium facing surface 10a or the top end of the protective layer 17.

The lower region R11 includes the respective end faces of the bottom shield layer 21 and the top shield layer 23 located in the medium facing surface 10a. The middle region R12 includes the respective end faces of the return yoke layer 26, the coupling layer 27 and the leading shield 32 located in the medium facing surface 10a, and also the exit end face 35a of the waveguide 35, the near-field light generating surface 38a, and the front end face 43a of the main pole 43. The upper region R13 includes the end face of the coupling layer 48 located in the medium facing surface 10a.

The first experiment will be described first. The first experiment examined the effect of a plurality of main light-blocking sections by using 20 each of the first to third samples and comparative samples. The comparative samples are without any main light-blocking section or subsidiary light-blocking section. The first samples include the upper main light-blocking section 81 and none of the other main light-blocking sections. The second samples include the lower main light-blocking sections 61 and 62 and the upper main light-blocking section 81, and none of the middle main light-blocking sections. The third samples include the lower main light-blocking sections 61 and 62, the middle main light-blocking sections 71 and 72, and the upper main light-blocking section 81. The middle main light-blocking section 72 in the third samples is shaped to be plane-symmetrical to the middle main light-blocking section 71 with respect to an imaginary plane that passes through the center in the Y direction of the waveguide 35 and is perpendicular to the element-forming surface 11a. None of the first to third samples include any subsidiary light-blocking section.

In the first experiment, first, a positive photoresist film was formed on the medium facing surface 10a in each of the first to third samples and comparative samples. Then, exposure laser light was caused to enter the entrance end face 35b of the waveguide 35 and the photoresist film was partially exposed to the exposure laser light emerging from the exit end face 35a to thereby provide the photoresist film with an exposure portion corresponding to the second region R2. The exposure portion corresponding to the second region R2 will hereinafter be referred to as the desired exposure portion. In the first experiment, the photoresist film was then developed to remove the desired exposure portion.

An ideal condition for the photoresist film after development in the first experiment is that only the desired exposure portion has been removed from the photoresist film. If part of the exposure laser light passes through a part of the head body 10 other than the waveguide 35 and reaches the photoresist film, the photoresist film will undergo unwanted exposure at a portion thereof other than the desired exposure portion. In such a case, the photoresist film after development suffers one or more defects at a portion or portions thereof other than the desired exposure portion. The defects are portions where the photoresist film is partially missing. When observed with an scanning electron microscope (hereinafter referred to as SEM), the defects can be detected as irregular-shaped portions.

The photoresist film after development serves as a mask to be used for forming the first portion 18A and the second portion 18B of the protective film 18. Any defects in the photoresist film thus lead to detects in the protective film 18.

Figure 21:
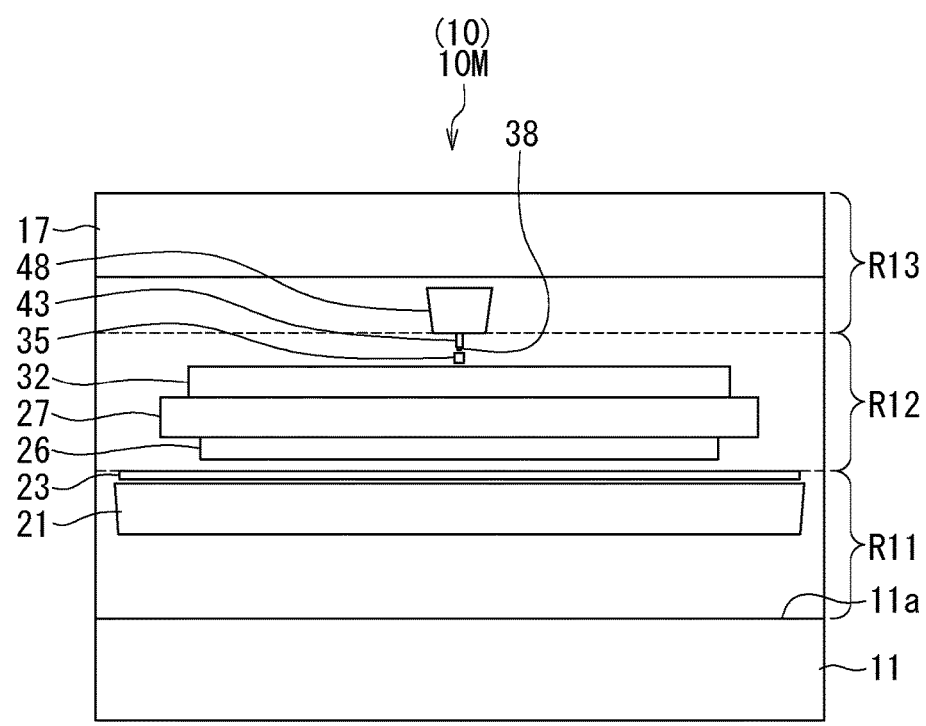
FIG. 21 is a front view showing a lower region, a middle region and an upper region in a first to a third experiment.

In the first experiment, the photoresist film after development was observed at a given magnification with an SEM and, for each of the regions R11, R12 and R13 shown in FIG. 21, 20 each of the four kinds of samples were examined for the percentage of samples where detects occurred. Such a percentage will hereinafter be referred to as defect rate. Table 1 shows the results of the first experiment.

TABLE 1

|  |  | Comparative sample | First sample | Second sample | Third sample |
|---|---|---|---|---|---|
| Defect rate | Upper region | 100% | 0% | 0% | 0% |
|  | Middle region | 100% | 100% | 100% | 0% |
|  | Lower region | 100% | 100% | 0% | 0% |

From the results of the first experiment, it can be seen that the lower main light-blocking sections 61 and 62 contribute to the prevention of defects in the lower region R11, the middle main light-blocking sections 71, 72 and 73 contribute to the prevention of defects in the middle region R12, and the upper main light-blocking section 81 contributes to the prevention of defects in the upper region R13. Further, the results of the first experiment indicate that providing all of the lower main light-blocking sections 61 and 62, the middle main light-blocking sections 71, 72 and 73 and the upper main light-blocking section 81 is effective for preventing defects in all of the three regions R11, R12 and R13.

The second experiment will now be described. The second experiment examined the effect of the middle main light-blocking sections 71 and 72 and the middle subsidiary light-blocking sections 74 and 75 by using 20 each of the fourth to eighth samples. The fourth and fifth samples each include the middle main light-blocking sections 71 and 72, and include neither of the middle subsidiary light-blocking sections 74 and 75. The sixth and seventh samples each include the middle subsidiary light-blocking sections 74 and 75 and include neither of the middle main light-blocking sections 71 and 72. The eighth samples include the middle main light-blocking sections 71 and 72 and the middle subsidiary light-blocking sections 74 and 75.

Figure 22:
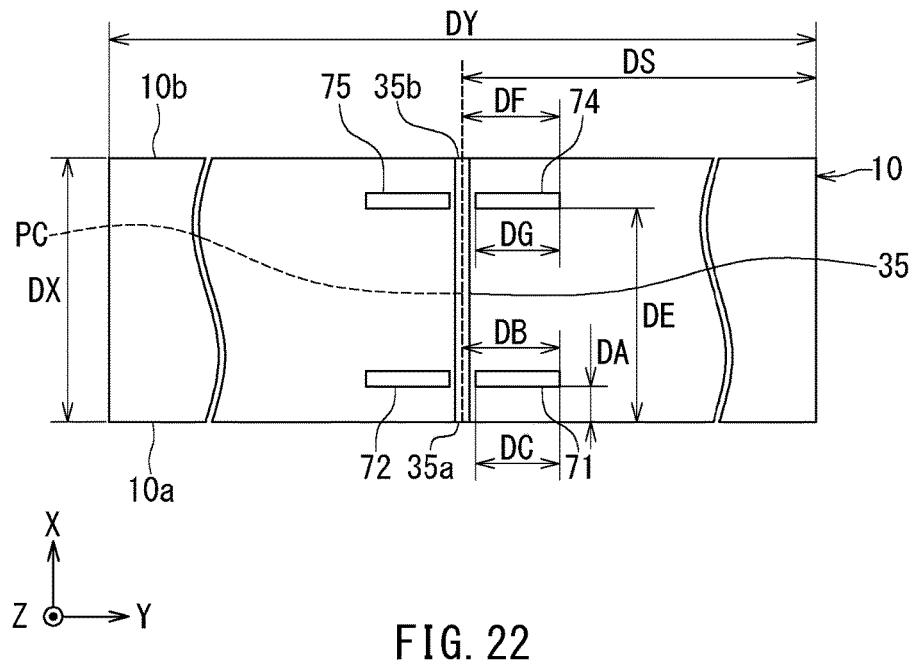
FIG. 22 is an explanatory diagram to illustrate the shape and arrangement of two middle main light-blocking sections and two middle subsidiary light-blocking sections in the second experiment.

FIG. 22 is an explanatory diagram to illustrate the shape and arrangement of the middle main light-blocking sections 71 and 72 and the middle subsidiary light-blocking sections 74 and 75 in the second experiment. In FIG. 22 the dashed straight line labeled PC represents an imaginary plane that passes through the center in the Y direction of the waveguide 35 and is perpendicular to the element-forming surface 11a. As shown in FIG. 22, the distance from the medium facing surface 10a to the middle main light-blocking section 71 is denoted by the symbol DA, the distance from the imaginary plane PC to the end of the middle main light-blocking section 71 in the Y direction is denoted by the symbol DB, and the length of the middle main light-blocking section 71 in the Y direction is denoted by the symbol DC. Further, the distance from the medium facing surface 10a to the middle subsidiary light-blocking section 74 is denoted by the symbol DE, the distance from the imaginary plane PC to the end of the middle subsidiary light-blocking section 74 in the Y direction is denoted by the symbol DF, and the length of the middle subsidiary light-blocking section 74 in the Y direction is denoted by the symbol DG.

Further, as shown in FIG. 22, the length of the head body 10 in the X direction is denoted by the symbol DX, the length of the head body 10 in the Y direction is denoted by the symbol DY, and the distance from the imaginary plane PC to the end of the head body 10 in the Y direction is denoted by the symbol DS.

For the fourth and fifth samples, the respective middle main light-blocking sections 71 were located at the same position and shaped differently from each other. In the second experiment, the position of the middle main light-blocking section 71 was expressed as the ratio of DA to DX, i.e., DA/DX, and the shape of the middle main light-blocking section 71 was expressed as the ratio of DB to DS, i.e., DB/DS, and the ratio of DC to DY, i.e., DC/DY. The fourth and fifth samples were made identical in DA/DX, and different in DB/DS and DC/DY. The specific values of the ratios DA/DX, DB/DS and DC/DY are shown in Table 2 to be described later. The middle main light-blocking section 72 is shaped to be plane-symmetrical to the middle main light-blocking section 71 with respect to the imaginary plane PC.

For the sixth and seventh samples, the respective middle subsidiary light-blocking sections 74 were formed into the same shape and located at different positions. In the second experiment, the position of the middle subsidiary light-blocking section 74 was expressed as the ratio of DE to DX, i.e., DE/DX, and the shape of the middle subsidiary light-blocking section 74 was expressed as the ratio of DF to DS, i.e., DF/DS, and the ratio of DG to DY, i.e., DG/DY. The sixth and seventh samples were made identical in DF/DS and DG/DY, and different in DE/DX. The specific values of the ratios DE/DX, DF/DS and DG/DY are shown in Table 2 to be described later. The middle subsidiary light-blocking section 75 is shaped to be plane-symmetrical to the middle subsidiary light-blocking section 74 with respect to the imaginary plane PC.

The eighth samples include the middle main light-blocking sections 71 and 72 having the same shape and located at the same position as in the fifth samples, and the middle subsidiary light-blocking sections 74 and 75 having the same shape and located at the same position as in the seventh samples.

In the second experiment, the same experiment as the first experiment on each of the first to third samples and comparative samples was performed on each of the fourth to eighth samples. Then, the defect rate was examined for the middle region R12 shown in FIG. 21. Further, in the second experiment, the areas of defective portions of the respective middle regions R12 were measured, and 20 each of the five kinds of samples were examined for the percentage of samples where the area of the defective portion(s) of the middle region R12 constituted 20% or more of the entire area of the middle region R12. Such a percentage will hereinafter be referred to as wide-area defect rate. Table 2 shows the results of the second experiment.

TABLE 2

|  | Fourth sample | Fifth sample | Sixth sample | Seventh sample | Eighth sample |
|---|---|---|---|---|---|
| DE/DX |  |  | 70% | 90% | 90% |
| DF/DS |  |  | 25% | 25% | 25% |
| DG/DY |  |  | 2% | 12% | 12% |
| DA/DX | 10% | 10% |  |  | 10% |
| DB/DS | 15% | 25% |  |  | 25% |
| DC/DY | 7% | 12% |  |  | 12% |
| Defect rate | 100% | 100% | 100% | 100% | 0% |
| Wide-area defect rate | 100% | 0% | 100% | 100% | 0% |

The results of the second experiment indicate that the middle main light-blocking sections 71, 72 and 73 are able to more effectively prevent defects in the middle region R12 than the middle subsidiary light-blocking sections 74, 75 and 76. The results of the second experiment further indicate that providing both the middle main light-blocking sections 71, 72 and 73 and the middle subsidiary light-blocking sections 74, 75 and 76 allows more effective prevention of defects in the middle region R12. Still further, the results of the second experiment indicate that increasing the middle main light-blocking sections 71, 72 and 73 in length in the Y direction allows more effective prevention of defects in the middle region R12.

The third experiment will now be described. The third experiment examined the effect of the lower main light-blocking sections 61 and 62 and the lower subsidiary light-blocking section 63 by using 20 each of the ninth to thirteenth samples. The ninth to eleventh samples each include the lower subsidiary light-blocking section 63, and include neither of the lower main light-blocking sections 61 and 62. The twelfth and thirteenth samples each include the lower main light-blocking sections 61 and 62 and the lower subsidiary light-blocking section 63.

Figure 23:
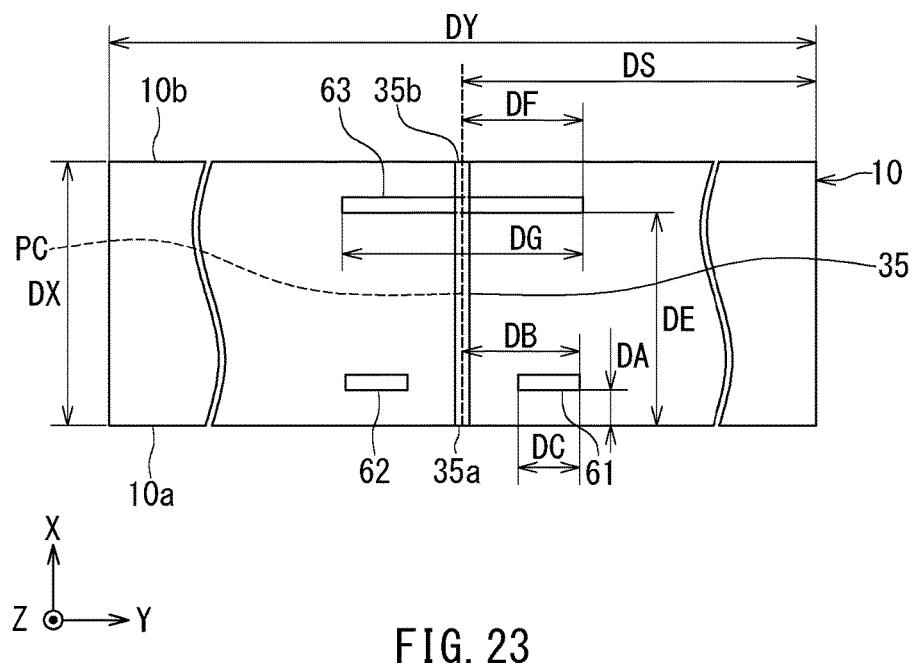
FIG. 23 is an explanatory diagram to illustrate the shape and arrangement of two lower main light-blocking sections and one lower subsidiary light-blocking section in the third experiment.

FIG. 23 is an explanatory diagram to illustrate the shape and arrangement of the lower main light-blocking sections 61 and 62 and the lower subsidiary light-blocking section 63 in the third experiment. The imaginary plane PC shown in FIG. 22 is also shown in FIG. 23. As shown in FIG. 23, the distance from the medium facing surface 10a to the lower main light-blocking section 61 is denoted by the symbol DA, the distance from the imaginary plane PC to the end of the lower main light-blocking section 61 in the Y direction is denoted by the symbol DB, and the length of the lower main light-blocking section 61 in the Y direction is denoted by the symbol DC. Further, the distance from the medium facing surface 10a to the lower subsidiary light-blocking section 63 is denoted by the symbol DE, the distance from the imaginary plane PC to the end of the lower subsidiary light-blocking section 63 in the Y direction is denoted by the symbol DF, and the length of the lower subsidiary light-blocking section 63 in the Y direction is denoted by the symbol DG. The lower subsidiary light-blocking section 63 in the third experiment is shaped to be symmetrical with respect to the imaginary plane PC.

Like FIG. 22, the length of the head body 10 in the X direction is denoted by the symbol DX, the length of the head body 10 in the Y direction is denoted by the symbol DY, and the distance from the imaginary plane PC to the end of the head body 10 in the Y direction is denoted by the symbol DS.

For the ninth to eleventh samples, the respective lower subsidiary light-blocking sections 63 were located at the same position and shaped differently from each other. In the third experiment, the position of the lower subsidiary light-blocking section 63 was expressed as the ratio of DE to DX, i.e., DE/DX, and the shape of the lower subsidiary light-blocking section 63 was expressed as the ratio of DF to DS, i.e., DF/DS, and the ratio of DG to DY, i.e., DG/DY. The ninth to eleventh samples were made identical in DE/DX, and different in DF/DS and DG/DY. The specific values of the ratios DE/DX, DF/DS and DG/DY are shown in Table 3 to be described later.

For the twelfth and thirteenth samples, the respective lower main light-blocking sections 61 were located at the same position and shaped differently from each other. In the third experiment, the position of the lower main light-blocking section 61 was expressed as the ratio of DA to DX, i.e., DA/DX, and the shape of the lower main light-blocking section 61 was expressed as the ratio of DB to DS, i.e., DB/DS, and the ratio of DC to DY, i.e., DC/DY. The twelfth and thirteenth samples were made identical in DA/DX and DB/DS, and different in DC/DY. The specific values of the ratios DA/DX, DB/DS and DC/DY are shown in Table 3 to be described later. The lower main light-blocking section 62 is shaped to be plane-symmetrical to the lower main light-blocking section 61 with respect to the imaginary plane PC. The twelfth and thirteenth samples each include the lower subsidiary light-blocking section 63 having the same shape and located at the same position as in the eleventh samples.

In the third experiment, the same experiment as the first experiment on each of the first to third samples and comparative samples was performed on each of the ninth to thirteenth samples. Then, the defect rate was examined for the lower region R11 shown in FIG. 21. Further, in the third experiment, similarly to the second experiment, the areas of defective portions of the respective lower regions R11 were measured, and 20 each of the five kinds of samples were examined for the wide-area defect rate, that is, the percentage of samples where the area of the defective portion(s) of the lower region R11 constituted 20% or more of the entire area of the lower region R11. Table 3 shows the results of the third experiment.

TABLE 3

|  | Ninth sample | Tenth sample | Eleventh sample | Twelfth sample | Thirteenth sample |
| --- | --- | --- | --- | --- | --- |
| DE/DX | 96% | 90% | 90% | 90% | 90% |
| DF/DS | 3% | 16% | 31% | 31% | 31% |
| DG/DY | 3% | 16% | 31% | 31% | 31% |
| DA/DX |  |  |  | 10% | 10% |
| DB/DS |  |  |  | 30% | 30% |
| DC/DY |  |  |  | 6% | 15% |
| Defect rate | 100% | 100% | 100% | 0% | 0% |
| Wide-area defect rate | 100% | 100% | 60% | 0% | 0% |

The results of the third experiment indicate that the lower main light-blocking sections 61 and 62 are able to more effectively prevent defects in the lower region R11 than the lower subsidiary light-blocking section 63. The results of the third experiment further indicate that increasing the lower subsidiary light-blocking section 63 in length in the Y direction allows reducing defects in the lower region R11, although the effect is smaller than that provided by the lower main light-blocking sections 61 and 62.

The present invention is not limited to the above-described embodiment, and various modifications may be made thereto. For example, as far as the requirements of the appended claims are met, the number, shape and locations of the at least one main light-blocking section and the at least one subsidiary light-blocking section can be freely chosen without being limited to the examples illustrated in the foregoing embodiment.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiment.

What is claimed is:

1. A thermally-assisted magnetic recording head comprising:
   a head body having a medium facing surface configured to face a magnetic recording medium; and
   a protective film covering the medium facing surface, wherein
   the head body includes:
      a plurality of head components for use to write data on the magnetic recording medium;
      an insulating section formed of an insulating material; and
      at least one main light-blocking section, the plurality of head components include a main pole for producing a write magnetic field, a waveguide, and a plasmon generator, the waveguide has an exit end face located in the medium facing surface and an entrance end face opposite to the exit end face, and is configured to allow excitation light having entered the entrance end face to propagate through the waveguide and exit from the exit end face, the plasmon generator has a near-field light generating surface located in the medium facing surface, and is configured to excite, on the plasmon generator, a surface plasmon resulting from the excitation light propagating through the waveguide, and to generate near-field light from the surface plasmon at the near-field light generating surface, the medium facing surface includes a first region and a second region, the first region includes neither of the exit end face and the near-field light generating surface, the second region includes the exit end face and the near-field light generating surface, the protective film includes a first portion covering the first region and a second portion covering the second region, the first portion and the second portion are different from each other in at least one of thickness and material configuration, and the at least one main light-blocking section is lower in transmittance for light of any wavelength within the range of 10 to 900 nm than the waveguide and the insulating section, and is located to intersect at least one imaginary straight line connecting the entrance end face and the first region.

2. The thermally-assisted magnetic recording head according to claim 1, further comprising an excitation light source mounted on the head body, for emitting the excitation light to allow it to enter the entrance end face.

3. The thermally-assisted magnetic recording head according to claim 1, wherein a distance from the medium facing surface to the at least one main light-blocking section is smaller than or equal to one-half a distance from the medium facing surface to the entrance end face.

4. The thermally-assisted magnetic recording head according to claim 3, wherein
the head body further includes at least one subsidiary light-blocking section,
the at least one subsidiary light-blocking section is lower in transmittance for light of any wavelength within the range of 10 to 900 nm than the waveguide and the insulating section, and
a distance from the medium facing surface to the at least one subsidiary light-blocking section is greater than one-half the distance from the medium facing surface to the entrance end face.

5. The thermally-assisted magnetic recording head according to claim 1, wherein the at least one main light-blocking section is formed of metal.

6. The thermally-assisted magnetic recording head according to claim 1, wherein the at least one imaginary straight line intersects none of the plurality of head components.

7. The thermally-assisted magnetic recording head according to claim 1, wherein the second portion is greater in thickness than the first portion.

8. The thermally-assisted magnetic recording head according to claim 1, wherein the first portion and the second portion are formed of respective single materials different from each other.

9. The thermally-assisted magnetic recording head according to claim 1, wherein one of the first portion and the second portion includes a layer of a material that is not contained in the other of the first portion and the second portion.

10. A manufacturing method for the thermally-assisted magnetic recording head of claim 1, comprising the steps of:
fabricating the head body; and
forming the protective film, wherein the step of forming the protective film includes the steps of:
forming a mask by patterning a photoresist film; and
forming the first portion and the second portion by using the mask,
wherein the step of forming the mask includes the step of causing exposure light to enter the entrance end face of the waveguide and exposing a portion of the photoresist film covering the second region of the medium facing surface to the exposure light emerging from the exit end face.

11. The manufacturing method for the thermally-assisted magnetic recording head according to claim 10, wherein the exposure light is different in wavelength from the excitation light.

12. The manufacturing method for the thermally-assisted magnetic recording head according to claim 10, wherein the mask covers the first region and does not cover the second region.

13. The manufacturing method for the thermally-assisted magnetic recording head according to claim 10, wherein the mask covers the second region and does not cover the first region.

* * * * *